United States Patent [19]
Satoh et al.

[11] Patent Number: 5,556,523
[45] Date of Patent: Sep. 17, 1996

[54] APPARATUS FOR ELECTROLYZING WATER

[75] Inventors: Motoharu Satoh, Honjo; Kazushige Watanabe, Maebashi, both of Japan

[73] Assignee: Sanden Corporation, Isesaki, Japan

[21] Appl. No.: 445,114

[22] Filed: May 19, 1995

[30] Foreign Application Priority Data

May 19, 1994 [JP] Japan ................................ 6-105758

[51] Int. Cl.⁶ ........................................... C02F 1/461
[52] U.S. Cl. .......................... 204/272; 204/275; 205/742
[58] Field of Search ............................ 204/272, 275; 205/742

[56] References Cited

U.S. PATENT DOCUMENTS 4,872,959  10/1989  Herbst et al. ............................ 204/109

FOREIGN PATENT DOCUMENTS 4-284889  10/1992  Japan .

*Primary Examiner*—Arun S. Phasge
*Attorney, Agent, or Firm*—Banner & Allegretti, Ltd.

[57] ABSTRACT

The present invention is directed to an apparatus for electrolyzing water. The electrolyzing apparatus includes a rectangular parallelpiped shaped casing having first and second chambers through which water flows. An inlet port at the first chamber conducts water into the first chamber from outside of the apparatus. Separate first and second outlet ports at the second chamber conduct the water to outside the apparatus from the second chamber. The first and second chambers are partioned by a wall. A communication path through the wall provides communication from the first chamber to the second chamber. Anode and cathode plates are disposed within the second chamber to generate a potential difference therebetween, so that the water which flows through the second chamber is electrolyzed. The communication path includes a fluid friction generating device, such as a plurality of circular holes having various diameters which are aligned along a line perpendicular the direction of the water flow. When the water passes through the circular holes, the fluid friction is generated along this line, so that the distribution of flow speed of the water in the second chamber becomes substantially uniform with respect to this line.

30 Claims, 15 Drawing Sheets

APPARATUS FOR ELECTROLYZING WATER

BACKGROUND OF THE INVENTION

1. Field of the Invention

The present invention generally relates to treatment of water, and more particularly to an apparatus for electrolyzing water.

2. Description of the Prior Art

A prior art apparatus for electrolyzing water (electrolyzing apparatus, hereinafter) is disclosed in Japanese Patent Application Publication No. 4-284889.

Referring to FIGS. 1 and 2, the electrolyzing apparatus 300 includes a generally rectangular parallelpiped shaped casing 310. Casing 310 comprises an upper member 311 and a lower member 312. Upper member 311 defines a shallow depression 311a and includes a flange portion 311b formed at its periphery, and lower member 312 defines a shallow depression 312a and includes a flange portion 312b formed at its periphery. The upper and lower members 311 and 312 are attached each other at their flange portions 311b and 312b, such that a water flow chamber 313 is defined within casing 310. The water flow chamber 313 generally extends along the entire width and length of casing 310.

The upper member 311 of casing 310 includes first, second and third rectangular parallelpiped projections 311c, 311d and 311e, which downwardly project from a bottom surface of shallow depression 311a of the upper member 311 along the entire width of the water flow chamber 313. First, second and third rectangular parallelpiped projections 311c, 311d and 311e are arranged to be spaced from one another in a direction of length of the upper member 311 at the predetermined different intervals. Second rectangular parallelpiped projection 311d is located at a position between first and third rectangular parallelpiped projections 311c and 311e. As illustrated in FIG. 4, second rectangular parallelpiped projection 311d includes a plurality of, for example, three teeth portions 311d' downwardly projecting from a top end surface thereof. Teeth 311d' are arranged to be spaced one another at about equal intervals. A top end surface of first rectangular parallelpiped projection 311c, a top end surface of each tooth 311d' of second rectangular parallelpiped projection 311d and a top end surface of third rectangular parallelpiped projection 311e are even with one another, but are higher than a top end surface of flange portion 311b.

The lower member 312 of casing 310 includes fourth, fifth and sixth rectangular parallelpiped projections 312c, 312d and 312e, which upwardly project from a bottom surface of shallow depression 312a of the lower member 312 along the entire width of the water flow chamber 313. Fourth, fifth and sixth rectangular parallelpiped projections 312c, 312d and 312e are arranged to face first, second and third rectangular parallelpiped projections 311c, 311d and 311e, respectively.

As illustrated in FIG. 4, a plurality of, for example, three teeth 312d' project from a top end surface of fifth rectangular parallelpiped projection 312d. Teeth 312d' are arranged to face the corresponding teeth 311d' of second rectangular parallelpiped projection 311d.

As illustrated in FIG. 5, a plurality of, for example, seven teeth 312e' project upwardly from a top end surface of sixth rectangular parallelpiped projection 312e. Teeth 312e' are arranged to be spaced one another at about equal intervals. A top end surface of fourth rectangular parallelpiped projection 312c, a top end surface of each tooth 312d' of fifth rectangular parallelpiped projection 312d and a top end surface of each tooth 312e' of sixth rectangular parallelpiped projection 312e are even with one another, but are lower than a top end surface of flange portion 312b of the lower member 312.

When the upper and lower members 311 and 312 are attached to each other at their flange portions 311b and 312b, substantial first, second and third walls 320, 330 and 340 are formed in the water flow chamber 313 by first and fourth rectangular parallelpiped projections 311c and 312c, second and fifth rectangular parallelpiped projections 311d and 312d, and third and sixth rectangular parallelpiped projections 311e and 312e, respectively. As a result of formation of the first, second and third walls 320, 330 and 340, the water flow chamber 313 is divided into first, second, third and fourth chamber sections 313a, 313b, 313c and 313d. First and second chamber sections 313a and 313b are isolated by first wall 320. Second and third chamber sections 311b and 311c are isolated by second wall 330. Third and fourth chamber sections 311c and 311d are isolated by third wall 340.

Referring to FIG. 3 in addition to FIG. 2, the top end surface of first rectangular parallelpiped projection 311c is spaced from the top end surface of the opposing fourth rectangular parallelpiped projection 312c. Also, the top end surface of first rectangular parallelpiped projection 311c is higher than the top end surface of flange portion 311b of upper member 311 and the top end surface of fourth rectangular parallelpiped projection 312c is lower than the top end surface of flange portion 312b of the lower member 312. Accordingly, first rectangular slot 321 is formed in first wall 320 at the mating surfaces of first and fourth rectangular parallelpiped projections 311c and 312c, so that first chamber section 313a is linked to second chamber section 313b therethrough.

Referring to FIG. 4 in addition to FIG. 2, the top end surface of second rectangular parallelpiped projection 311d is spaced from the top end surface of the opposing fifth rectangular parallelpiped projection 312d. Also, the top end surface of second rectangular parallelpiped projection 311d is higher than the top end surface of flange portion 311b of upper member 311 and the top end surface of fifth rectangular parallelpiped projection 312d is lower than the top end surface of flange portion 312b of the lower member 312. Accordingly, second rectangular slot 331 is formed in second wall 330 at the mating surfaces of second and fifth rectangular parallelpiped projections 311d and 312d, so that second chamber section 313b is linked to third chamber section 313c therethrough.

Second rectangular slot 331 includes three narrower portions 331a because the top end surface of second rectangular parallelpiped projection 311d is higher than the top end surface of each tooth 311d' of second rectangular parallelpiped projection 311d and the top end surface of fifth rectangular parallelpiped projection 312d is lower than the top end surface of each tooth 312d' of fifth rectangular parallelpiped projection 312d. An opening area of second rectangular slot 331 is designed to be smaller than an opening area of later-mentioned inlet port 350.

Referring to FIG. 5 in addition to FIG. 2, the top end surface of third rectangular parallelpiped projection 311e is spaced from the top end surface of the opposing sixth rectangular parallelpiped projection 312e. Also, the top end surface of third rectangular parallelpiped projection 311e is higher than the top end surface of flange portion 311b of upper member 311 and the top end surface of sixth rectangular parallelpiped projection 312e is lower than the top end surface of flange portion 312b of lower member 312. Accordingly, third rectangular slot 341 is formed in third wall 340 at the mating surfaces of third and sixth rectangular parallelpiped projections 311e and 312e, so that third chamber section 313c is linked to fourth chamber section 313d therethrough. Third rectangular slot 341 includes seven narrower portions 341a because the top end surface of sixth rectangular parallelpiped projection 312e is lower than the top end surface of each tooth 312e' of sixth rectangular parallelpiped projection 312e.

Referring to FIGS. 1 and 2 again, a hollow indent 311g is formed at a part of the bottom surface of shallow depression 311a of upper member 311. Hollow indent 311g extends form one end (to the right in FIG. 2) of third chamber section 313c and terminates at a position which is located at about four fifths of the length of third chamber section 313c, but is offset from the longitudinal central axis of casing 310.

Electrolyzing apparatus 300 is provided with an inlet port 350 and first and second outlet ports 361 and 362. Inlet port 350 is formed at one corner (to the upper left in FIG. 1) of a top end surface of upper member 311. Inlet port 350 links an inner hollow space of first chamber section 313a of the water flow chamber 313 to, for example, a faucet (not shown) of city water supply through a pipe member (not shown). First outlet portion 361 is formed at the other corner (to the lower right in FIG. 1) of the top end surface of upper member 311, and links an inner hollow space of fourth chamber section 313d of the water flow chamber 313 to, for example, a bottle (not shown) through a pipe member (not shown). Second outlet port 362 is formed at the top end surface of upper member 311 at a position which corresponds to a terminal end of hollow indent 311g, and links an inner hollow space of hollow indent 311g to, for example, another bottle (not shown) through a pipe member (not shown).

Referring to FIG. 2, rectangular cathode plate 370 of electroconductive material is disposed within shallow depression 312a of lower member 312 of casing 310 at the portion corresponding to third chamber section 313c of water flow chamber 313. Cathode plate 370 extends about entire area of third chamber section 313c. Thickness of cathode plate 370 is designed to be a certain value such that a top end surface thereof is even with a lower end surface of second rectangular slot 331 when cathode plate 370 is disposed within shallow depression 312a. Similarly, rectangular anode plate 380 of electroconductive material is disposed within shallow depression 311a of upper member 311 of casing 310 at the portion corresponding to third chamber section 313c of water flow chamber 313. Anode plate 380 generally extends about entire area of third chamber section 313c. Thickness of anode plate 380 is designed to be a certain value such that a top end surface of anode plate 380 is even with an upper end surface of second rectangular slot 331 when anode plate 380 is disposed within shallow depression 311a. Accordingly, cathode and anode plates 370 and 380 are spaced each other through an air gap having a predetermined distance. One longitudinal end (to the right in FIG. 2) of anode plate 380 is spaced from a side surface of third rectangular parallelpiped projection 311e, so that an air gap 311h is created therebetween. As a result, hollow indent 311g is linked to third chamber section 313c through air gap 311h.

A pair of terminal rods 371 of electroconductive material penetrate through a central region of lower member 312, and are fixedly connected to a lower surface of cathode plate 370 by, for example brazing. The pair of terminal rods 371 are spaced each other, and are firmly secured to lower member 312 by nuts 371a so that cathode plate 370 is fixedly disposed within shallow depression 312a of lower member 312 of casing 310. Similarly, a pair of terminal rods 381 of electroconductive material penetrate through a central region of upper member 311, and are fixedly connected to an upper surface of anode plate 380 by, for example, brazing. The pair of terminal rods 381 are spaced each other, and are firmly secured to upper member 311 by nuts 381a so that anode plate 380 is fixedly disposed within shallow depression 311a of upper member 311 of casing 310. Terminal rods 371 and 381 are used to connect cathode and anode plates 370 and 380 to negative and positive terminals (not shown) of an electric power source (not shown) of directive current, respectively so as to generate potential difference between cathode and anode plates 370 and 380.

In operation of the electrolyzing apparatus 300, the city water flows into first chamber section 313a of the water flow chamber 313 through inlet port 350, and flows through first chamber section 313a. The water flowing through first chamber section 313a flows through second chamber section 313b past first rectangular slot 321, and further flows through to third chamber section 313c past second rectangular slot 331. Since the opening area of second rectangular slot 331 is designed to be smaller than the opening area of inlet port 350, a percentage of static pressure of water in the second chamber section 313b becomes a large value. Because of this fact, and because the top end surface of cathode plate 370 is even with the lower end surface of second rectangular slot 331 and the top end surface of anode plate 380 is even with the upper end surface of second rectangular slot 331, the water moving past second rectangular slot 331 flows through third chamber section 313c in a condition similar to a laminar flow.

As the water flows through third chamber section 313c, a potential difference is generated between cathode and anode plates 370 and 380 by virtue of connecting cathode and anode plates 370 and 380 to the negative and positive terminals of the electric power source (not shown), respectively, so that the water is electrolyzed in a manner which will be described in detail in a description of a first embodiment of the present invention.

As a result, a $H^+$ rich water layer close to anode plate 380 and a $OH^-$ rich water layer close to cathode plate 370 are generated in the flow of water in third chamber section 313c. Accordingly, at one end (to the right in FIG. 2) of the flow of water in third chamber section 313c, the $H^+$ rich water flows into hollow indent 311g through air gap 311h, and the $OH^-$ rich water flows into fourth chamber section 313d through third rectangular slot 341. The $H^+$ rich water in hollow indent 311g flows to the bottle (not shown) through second outlet port 362 to be stored therein. The $OH^-$ rich water in fourth chamber section 313d flows to the other bottle (not shown) through first outlet port 361 to be stored therein.

In the above-mentioned prior art embodiment, however, the static pressure of water in the second chamber section 313b has an uneven distribution as indicated by arrows "A" in FIG. 6, because the water flows into first chamber section 313a through inlet port 350 which is located at one corner (the upper left in FIGS. 1 and 6) of a top wall of first chamber section 313a. As a result, a speed of the laminar flow of water in the third chamber section 313c has an uneven distribution, as indicated by arrows "B" in FIG. 6, which is generally similar to that of the static pressure of water in the second chamber section 313b. Therefore, the time for electrolyzing water in the third chamber section 313c, is relatively shorter in the one part of the laminar flow of water having a relatively higher flow speed as compared to the other part of the laminar flow of water having a relatively lower flow speed. Therefore, a part of the laminar flow of water in the third chamber section 313c having a relatively higher flow speed is insufficiently electrolyzed. Accordingly, the electrolyzation of water in the third chamber section 313c is inefficiently carried out.

SUMMARY OF THE INVENTION

Accordingly, an object of the present invention to provide an apparatus which can effectively electrolyze water.

In order to obtain the above object, an apparatus for electrolyzing water in accordance with the present invention includes a casing within which a hollow space is defined so as to guide water therethrough. The hollow space includes a first end and a second end. The hollow space includes a first chamber section at the first end and a second chamber section at the second end. The first and second chamber sections are aligned along a first line which connects the first end and the second end.

An inlet port is provided at the first chamber section to conduct the water into the first chamber section from outside of the apparatus. Separate first and second outlet ports are provided at the second chamber section to conduct the water to the outside of the apparatus from the second chamber section. A wall in the hollow space of the casing located at a boundary between the first and second chamber sections along a second line perpendicular to the first line separates the first chamber section from said second chamber section.

A communication path is formed through the wall for providing communication from the first chamber section to the second chamber section. A potential difference generating device is provided at the second chamber section for generating potential difference at the second chamber section, electrolyzing the water which flows through the second chamber section.

A fluid friction generating device for generating fluid friction along the second line is provided in the communication path so that when the water passes through the communication path a distribution of flow speed of the water in the second chamber section becomes substantially uniform with respect to the second line.

DETAILED DESCRIPTION OF THE PREFERRED EMBODIMENTS

Figure 1:
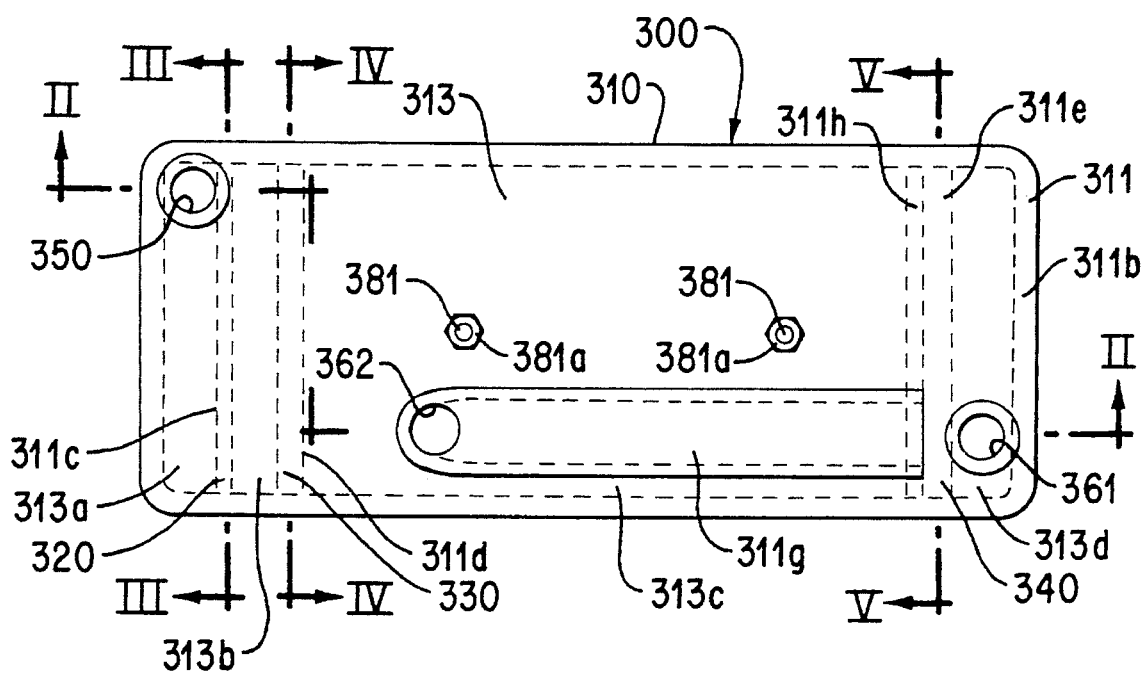
FIG. 1 is a plan view of an apparatus used for electrolyzing water in accordance with one prior art embodiment.
Figure 2:
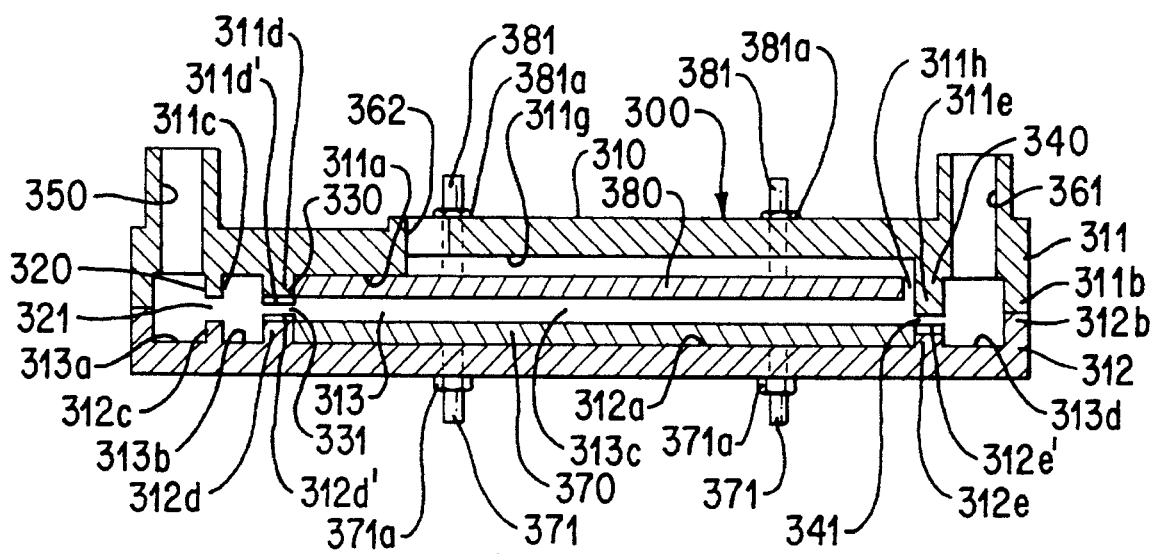
FIG. 2 is a cross-sectional view taken on line II—II of FIG. 1.
Figure 3:
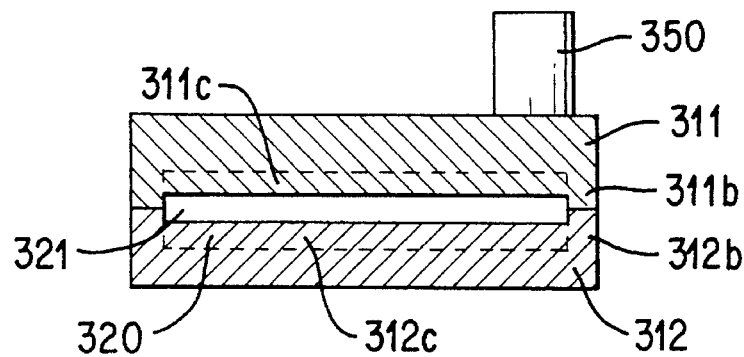
FIG. 3 is a cross-sectional view taken on line III—III of FIG. 1.
Figure 4:
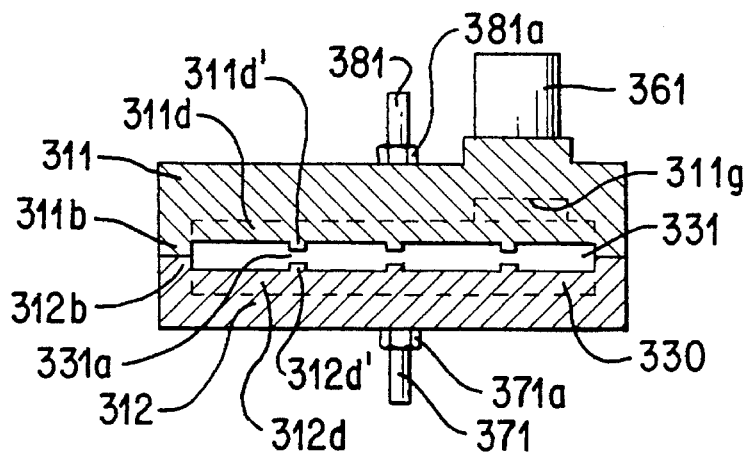
FIG. 4 is a cross-sectional view taken on line IV—IV of FIG. 1.
Figure 5:
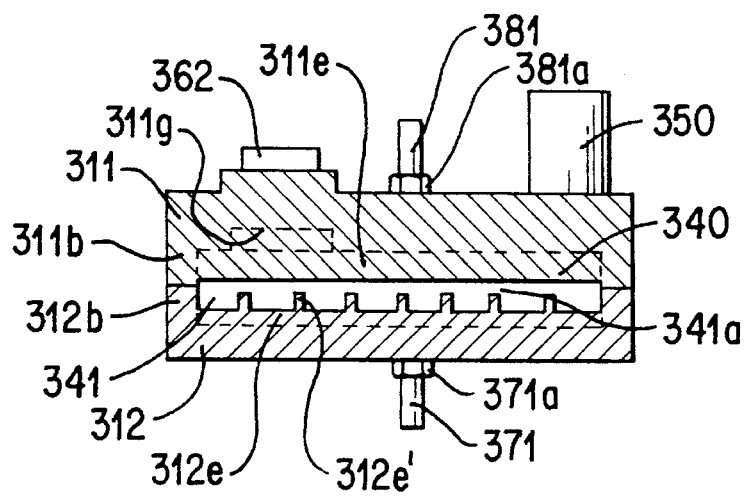
FIG. 5 is a cross-sectional view taken on line V—V of FIG. 1.
Figure 6:
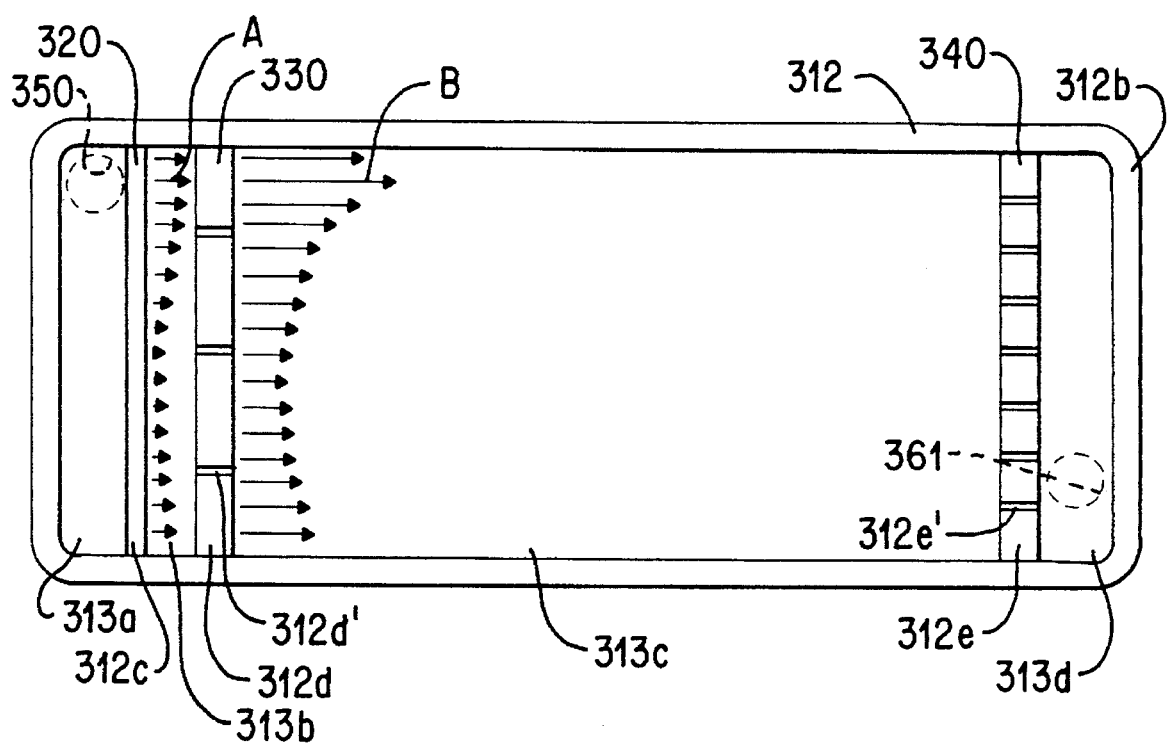
FIG. 6 is a plan view of a lower member of a casing of the apparatus shown in FIG. 1. In the drawings, a distribution of static pressure of water in a second chamber section of a water flow chamber of the apparatus, and a distribution of a flow speed of water in a third chamber section of the water flow chamber of the apparatus are schematically illustrated.
Figure 7:
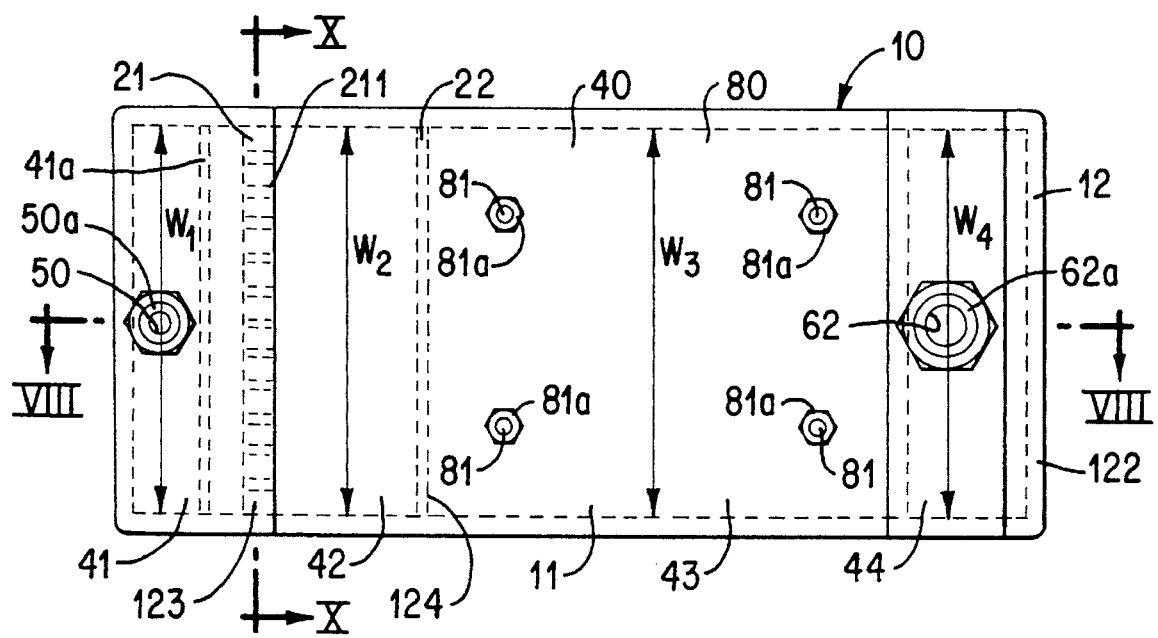
FIG. 7 is a plan view of an apparatus for electrolyzing water in accordance with a first embodiment of the present invention.
Figure 8:
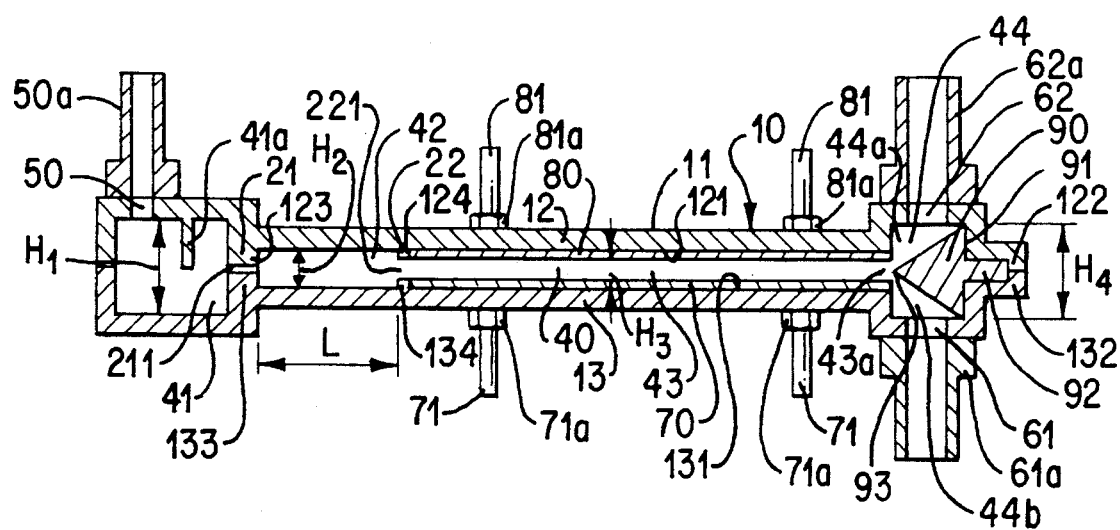
FIG. 8 is a cross-sectional view taken on line VIII—VIII of FIG. 7.

Referring to FIGS. 7 and 8, an electrolyzing apparatus 10 in accordance with a first embodiment of the present invention includes casing 11 which is made of non-electroconductive and waterproof material, for example, ABS resin, and is generally rectangular parallelpiped in shape. Casing 11 comprises an upper member 12 and a lower member 13. Upper member 12 defines a shallow depression 121 therein and includes a flange portion 122 formed at its periphery. Lower member 13 defines a shallow depression 131 therein and includes a flange portion 132 formed at its periphery. The upper and lower members 12 and 13 are attached to each other at their flange portions 122 and 132 by, for example, hot melting, such that a water flow chamber 40 is defined within casing 11. Alternatively, the upper and lower members 12 and 13 may be releasably attached to each other at their flange portions 122 and 132 by, for example, bolt-nuts (not shown) through a sealing element (not shown) made of, for example, silicon rubber. The water flow chamber 40 generally extends along the entire width and length of casing 11.

The upper member 12 of casing 11 includes first and second parallelpiped projections 123 and 124 which project downwardly from a bottom surface of shallow depression 121 of the upper member 12 along the entire width of water flow chamber 40. First and second rectangular parallelpiped projections 123 and 124 are spaced from each other in a direction of length of the upper member 12 by a predetermined distance. A top end surface of first rectangular parallelpiped projection 123 is designed to be lower than a top end surface of second rectangular parallelpiped projection 124.

Figure 10:
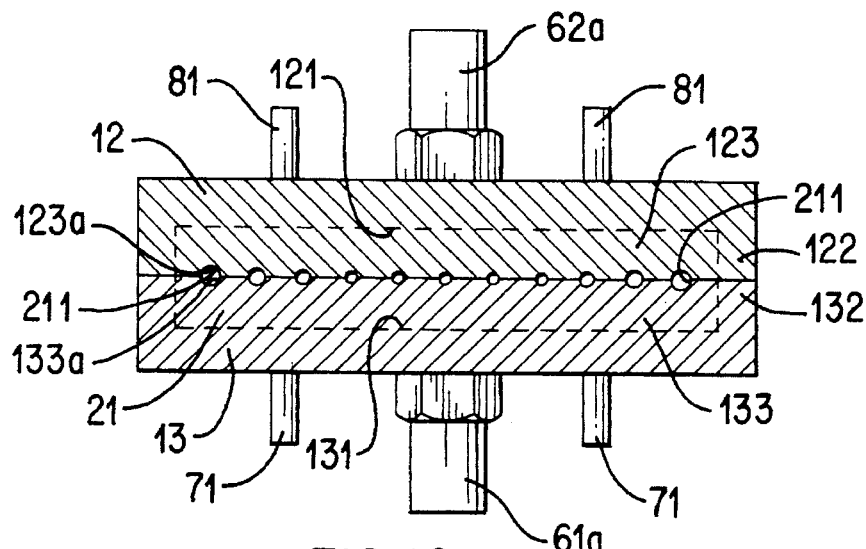
FIG. 10 is a cross-sectional view taken on line X—X of FIG. 7.

As illustrated in FIG. 10, a plurality of, for example, eleven first indents 123a, each having a semicircular cross section, are formed at a top end surface of first rectangular parallelpiped projection 123. First indents 123a are arranged to be spaced one from another by about equal intervals, and have radiuses which decrease in a stepped fashion from both lateral ends to the lateral center of first rectangular parallelpiped projection 123.

The lower member 13 of casing 11 includes third and fourth rectangular parallelpiped projections 133 and 134 which project upwardly from a bottom surface of shallow depression 131 of the lower member 13 along the entire width of the water flow chamber 40. Third and fourth rectangular parallelpiped projections 133 and 134 are arranged to face first and second rectangular parallelpiped projections 123 and 124, respectively. A top end surface of third rectangular parallelpiped projection 133 is designed to be higher than a top end surface of fourth rectangular parallelpiped projection 134.

As illustrated in FIG. 10, a plurality of, for example, eleven second indents 133a, each having a semicircular cross section, are formed at a top end surface of third rectangular parallelpiped projection 133. Second indents 133a are arranged to face and align with the corresponding first indents 123a. The corresponding first and second indents 123a and 133a are identical. Accordingly, the radius of second indents 133a decreases in a stepped fashion from both lateral ends to the lateral center of third rectangular parallelpiped projection 133, just as the radius of first indents 123a decreases.

When the upper and lower members 12 and 13 are attached each other at their flange portions 122 and 132, first and second walls 21 and 22 are formed in the water flow chamber 40 by first and third rectangular parallelpiped projections 123 and 133, and second and fourth rectangular parallelpiped projections 124 and 134, respectively. As a result of the formation of the first and second walls 21 and 22, first, second and third chamber sections 41, 42 and 43 are defined in the water flow chamber 40. First and second chamber sections 41 and 42 are isolated by first wall 21. Second and third chamber sections 42 and 43 are isolated by second wall 22.

Referring to FIG. 10 in addition to FIG. 8, the bottom end surface of first rectangular parallelpiped projection 123 is in contact with the top end surface of third rectangular parallelpiped projection 133 because the bottom end surface of first rectangular parallelpiped projection 123 is even with the bottom end surface of flange portion 122 of upper member 12, and the top end surface of third rectangular parallelpiped projection 133 is even with the top end surface of flange portion 132 of the lower member 13. Accordingly, eleven circular holes 211 having various diameters are defined by first and second indents 123a and 133a at the mating surfaces of first and third rectangular parallelpiped projections 123 and 133. Thus, first chamber section 41 is linked to second chamber section 42 through holes 211. The diameter of circular holes 211 decreases in a stepped manner from both lateral ends to the lateral center of first wall 21. The sum of the opening areas of circular holes 211 is designed to be smaller than the opening area of later-mentioned inlet port 50.

Referring to FIG. 8, the bottom end surface of second rectangular parallelpiped projection 124 is spaced from the top end surface of the opposing fourth rectangular parallelpiped projection 134. Also, the bottom end surface of second rectangular parallelpiped projection 124 is higher than the bottom end surface of flange portion 122 of upper member 12 and the top end surface of fourth rectangular parallelpiped projection 134 is lower than the top end surface of flange portion 132 of the lower member 13. Accordingly, rectangular slot 221 is formed in second wall 22 at the facing and aligned surfaces of second and fourth rectangular parallelpiped projections 124 mid 134. Second chamber section 42 is thus linked to third chamber section 43 through slot 221.

Again referring to FIG. 8, one longitudinal end portion (to the left in FIG. 8) of shallow depression 121 of upper member 12, which correspond to the first chamber section 41, is further depressed from the bottom surface thereof. Similarly, one longitudinal end portion (to the left in FIG. 8) of shallow depression 131 of bottom member 13, which correspond to the first chamber section 41, is further depressed from the bottom surface thereof. Guide wall 41a projects downwardly from the inner top end surface of first chamber section 41 of water flow chamber 40, and terminates at a position which is about even with the bottom end surface of first rectangular parallelpiped projection 123. Guide wall 41a is located at about two-thirds of the length of first chamber section 41 and extends along the entire width of first chamber section 41 so as to be parallel to first wall 21.

The other longitudinal end portion (to the right in FIG. 8) of shallow depression 121 of upper member 12 is further depressed from the top end surface thereof. Similarly, the other longitudinal end portion (to the right in FIG. 8) of shallow depression 131 of lower member 13 is further depressed from the bottom end surface thereof. As a result, when the upper and lower members 12 and 13 are attached each other, fourth chamber section 44 is defined in water flow chamber 40 at a location opposite to first chamber section 41.

Referring to FIGS. 8 and 10 again, triagonal prism member 90, having an isosceles triangular cross section, is disposed within fourth chamber section 44. Triagonal prism member 90 is made of same material of casing 11, such as, ABS resin. A side 91 of triagonal prism member 90 corresponding to the base of the isosceles triangular cross section is in contact with one side wall (to the right in FIG. 8) of fourth chamber section 44. Triagonal prism member 90 is designed such that the length thereof is about equal to the width of fourth chamber section 44, and the width of the side 91 thereof is about equal to the height of fourth chamber section 44. Projection 92 having a rectangular cross section projects from side 91 of triagonal member 90 and is fixedly sandwiched by the upper and lower members 12 and 13.

Ridge 93 of triagonal prism member 90, which is opposite to the side 91, is located on a plane which evenly divides the water flow chamber 40 in a direction of its height. Ridge 93 of triagonal prism member 90 faces outlet 43a of third chamber section 43. Ridge 93 can be located in and out of the outlet 43a of third chamber section 43 dependent upon the design dimensions of triagonal prism member 90. A distance measured between the ridge 93 and the outlet 43a of third chamber section 43 is indicated by "S" in FIG. 9. For purposes of reference, when ridge 93 is located in outlet 43a of third chamber section 43, distance "S" becomes negative. On the other hand, when ridge 93 is located out of outlet 43a of third chamber section 43, distance "S" becomes positive.

Still referring to FIG. 8, electrolyzing apparatus 10 is provided with an inlet port 50 and a first and second outlet ports 61 and 62. Inlet port 50 is formed at a top end surface of first chamber section 41 at a region forward (to the left in FIG. 8) of guide wall 41a. Joint element 50a is associated with inlet port 50 so as to be connected to, for example, a faucet (not shown) of city water through a pipe member (not shown). First outlet port 61 is formed at a central region of a bottom end surface of fourth chamber section 44. Joint element 61a is associated with first outlet port 61 so as to be connected to, for example, a bottle (not shown) through a pipe member (not shown). Second outlet port 62 is formed at a central region of a top end surface of fourth chamber section 44. Joint element 62a is associated with second outlet port 62 so as to be connected to, for example, another bottle (not shown) through a pipe member (not shown).

Cathode plate 70 having electroconductivity is disposed within shallow depression 131 of lower member 13 of casing 11 at the portion corresponding to third chamber section 43 of water flow chamber 40. Cathode plate 70 is made of titanium and is plated with platinum, and extends about entire area of third chamber section 43. Thickness of cathode plate 70 is designed to be a certain value such that a top end surface of cathode plate 70 is even with a lower end surface of rectangular slot 221 when cathode plate 70 is disposed within shallow depression 131. Similarly, anode plate 80 having electroconductivity is disposed within shallow depression 121 of upper member 12 of casing 11 at the portion corresponding to third chamber section 43 of water flow chamber 40. Anode plate 80 is made of titanium and is plated with platinum, and also extends about entire area of third chamber section 43. Thickness of anode plate 80 is designed to be a certain value such that a bottom end surface of anode plate 80 is even with an upper end surface of rectangular slot 221 when anode plate 80 is disposed within shallow depression 121.

A plurality of, for example, four identical terminal rods 71 having electroconductivity penetrate through lower member 13, and are fixedly connected to four corner regions of a lower surface of cathode plate 70, respectively by, for example, brazing. Terminal rods 71 are made of titanium and plated with platinum. Terminal rods 71 are firmly secured to lower member 13 by nuts 71a so that cathode plate 70 is fixedly disposed within shallow depression 131 of lower member 13 of casing 11. Similarly, a plurality of, for example, four identical terminal rods 81 having electroconductivity penetrate through upper member 12, and are fixedly connected to four corner regions of an upper surface of anode plate 80, respectively by, for example, brazing. Terminal rods 81 are made of titanium and plated with platinum. Terminal rods 81 are firmly secured to upper member of casing 11 by nuts 81a so that anode plate 80 is fixedly disposed within shallow depression 121 of upper member 12 of casing 11. Terminal rods 71 and 81 are used to connect cathode and anode plates 70 and 80 to negative and positive terminals (not shown) of an electric power source (not shown) of direct current, respectively. A potential difference thus is generated between cathode and anode plates 70 and 80. In operation of the apparatus 10, the potential difference is varied so as to generate an electric current having a predetermined constant amperage through the water in third chamber section 43.

Figure 9:
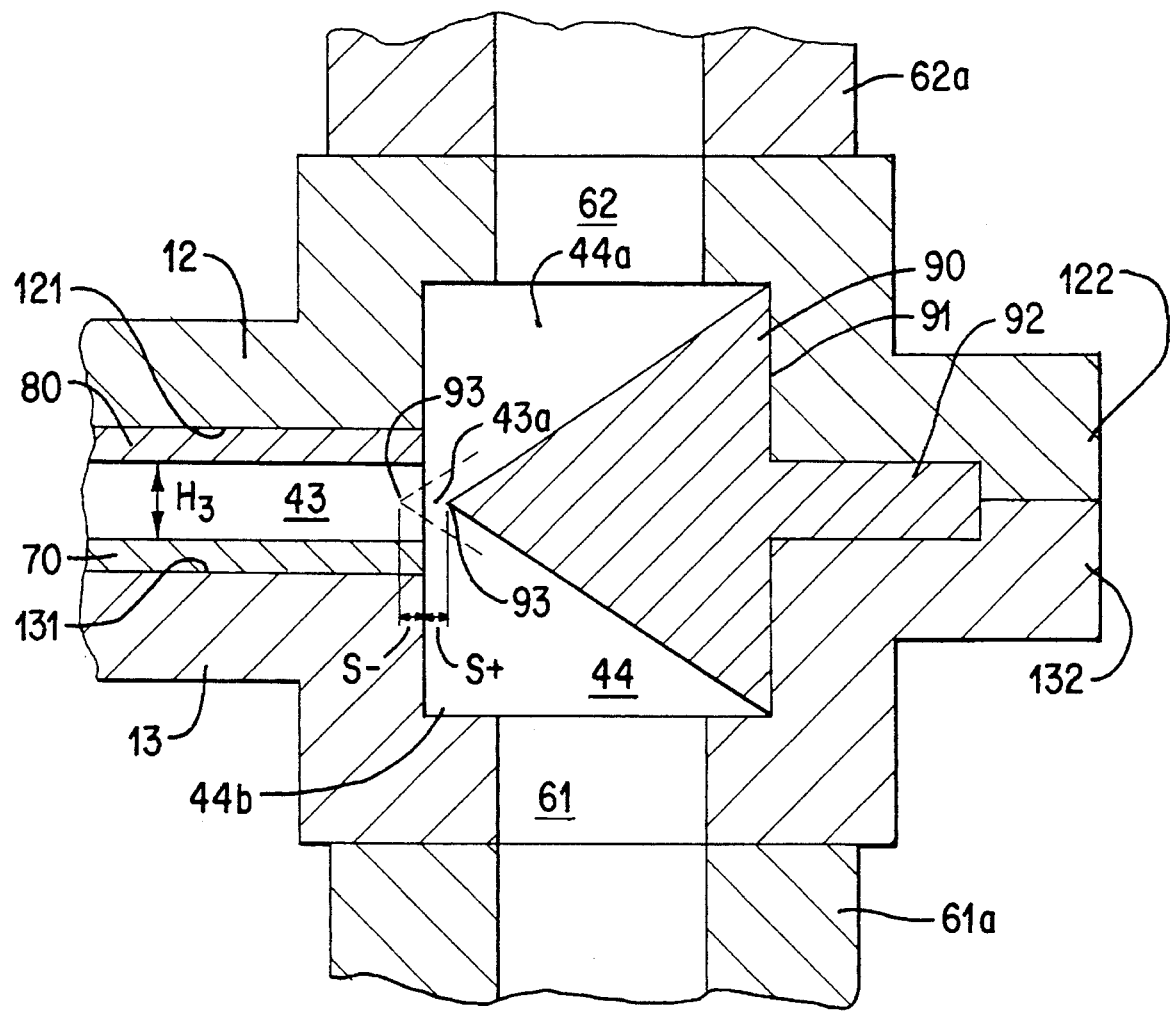
FIG. 9 is an enlarged partial view of FIG. 8.

Referring to FIGS. 7, 8 and 9, electrolyzing apparatus 10 is constructed to have the following dimensional relationships.

$$H_1 > H_2 > H_3 \tag{1}$$

$$H_1 = H_4 \tag{2}$$

$$W_1 = W_2 = W_3 = W_4 \tag{3}$$

$$L \geq H_3 \tag{4}$$

preferably, $$L \geq 3 \cdot H_3 \tag{4'}$$

$$-(\tfrac{1}{2}).H_3 \leq S \leq +(\tfrac{1}{2}).H_3 \tag{5}$$

In the above equations;

$H_1$ is the height of first chamber section 41, $H_2$ is the height of second chamber section 42, $H_3$ is the height of third chamber section 43, $H_4$ is the height of fourth chamber section 44, $W_1$ is the width of first chamber section 41, $W_2$ is the width of second chamber section 42, $W_3$ is the width of third chamber section 43, $W_4$ is the width of fourth chamber section 44, L is the length of second chamber section, and S is the distance measured between the ridge 93 and the outlet 43a of third chamber section 43.

In operation of the electrolyzing apparatus 10, the city water flows into first chamber section 41 of the water flow chamber 40 through inlet port 50. The water flowing into first chamber section 41 is guided by guide wall 41a to move laterally and downwardly, and then to turn at the lower end of guide wall 41a, and flow upwardly. Accordingly, the first chamber section 41 is used for a space into which the water is introduced from the outside of electrolyzing apparatus 10. The water flowing through first chamber section 41 as described above flows into second chamber section 42 through circular holes 211. Since the sum of the opening area of circular holes 211 is designed to be smaller than the opening area of inlet port 50, a percentage of static pressure of water in the first chamber section 41 becomes a large value. The water flowing through second chamber section 42 flows into third chamber section 313c through rectangular slot 221.

As the water flows through third chamber section 43 where potential difference is generated between cathode and anode plates 70 and 80 by virtue of connecting cathode and anode plates 70 and 80 to the negative and positive terminals of an electric power source, respectively, the water is electrolyzed in a manner described in detail below.

Adjacent to anode plate 80, the water in third chamber section 43 is electrolyzed as follows.

$$2H_2O \rightarrow 4H^+ + O_2 + 4e^- \tag{6}$$

$$2Cl^- \rightarrow Cl_2 + 2e^- \tag{7}$$

$$Cl_2 + H_2O \rightarrow HClO + H^+ + Cl^- \tag{8}$$

$$HClO \leftrightarrows H^+ ClO^- \tag{9}$$

In equation (7), $Cl^-$ is a material which is dissolved in the city water. Furthermore, $Cl^-$ is attracted to anode plate 80 during electrolyzation.

Adjacent to cathode plate 70, the water in third chamber section 43 is electrolyzed as follows.

$$4H_2O + 4e^- \rightarrow 4OH^- + 2H_2\uparrow \tag{10}$$

Furthermore, $Ca^{++}$ and $Mg^{++}$ dissolved in the city water are attracted to cathode plate 70 during electrolyzation.

As a result, a $H^+$ and $ClO^-$ rich water (hereinafter, $H^+$ rich water) layer close to anode plate 80, and a $OH^-$, $Ca^{++}$ and $Mg^{++}$ rich water (hereinafter, $OH^-$ rich water) layer close to cathode plate 70, are generated in the flow of water in third chamber section 43. Accordingly, the third chamber section 43 is used as a space in which the water is electrolyzed.

At a flow end (to the right in FIG. 8) of third chamber section 43, the $H^+$ rich water layer close to anode plate 80 and the $OH^-$ rich water layer close to cathode plate 70 are guided by triagonal prism member 90 to be moved into upward and downward portions 44a and 44b of fourth chamber section 44, respectively. The $H^+$ rich water in the upward portion 44a of fourth chamber section 44 has acidity of, for example, pH 5–6, and further flows to the bottle (not shown) through second outlet port 62 to be stored therein. The $OH^-$ rich water in downward portion 44b of fourth chamber section 44 has alkalinity of, for example, pH 8–11, and further flows to the other bottle (not shown) through first outlet port 61 to be stored therein. Accordingly, the fourth chamber section 44 is used as a space at which the $H^+$ rich water and $OH^-$ rich water are divided into two separate flows.

Figure 11:
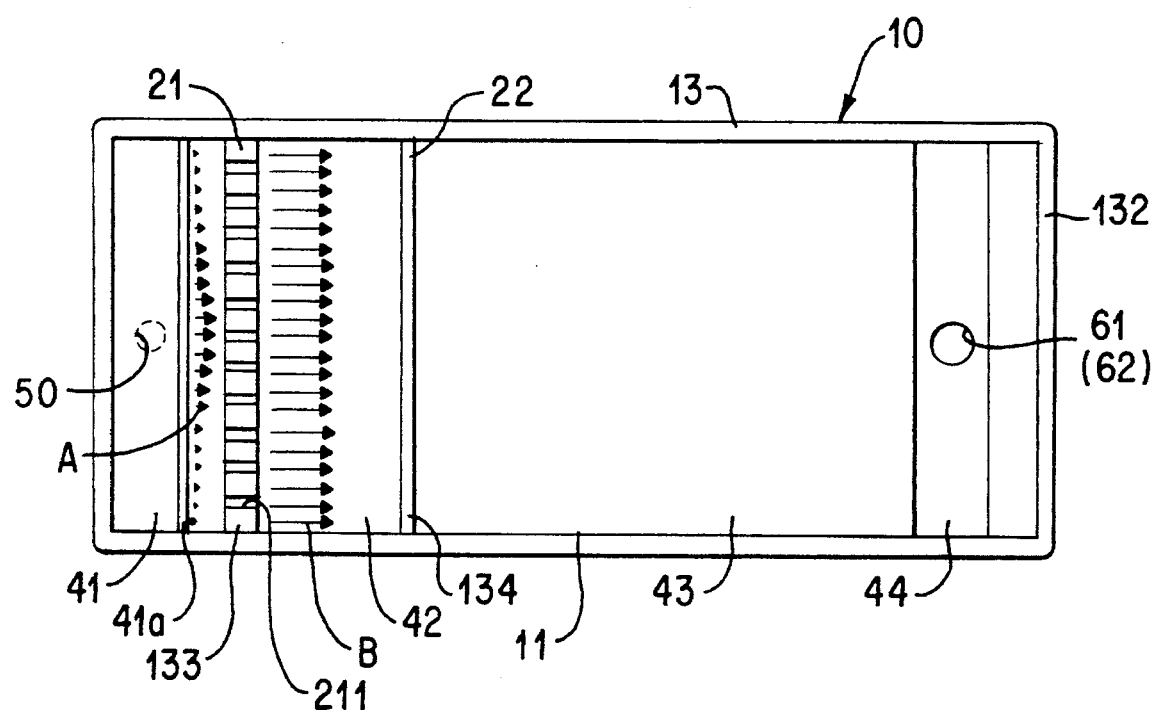
FIG. 11 is a plan view of a lower member of a casing of the apparatus shown in FIG. 7. In the drawing, a distribution of static pressure of water in a first chamber section of a water flow chamber of the apparatus, and a distribution of a flow speed of water in a second chamber section of the water flow chamber of the apparatus are schematically illustrated.
Figure 14:
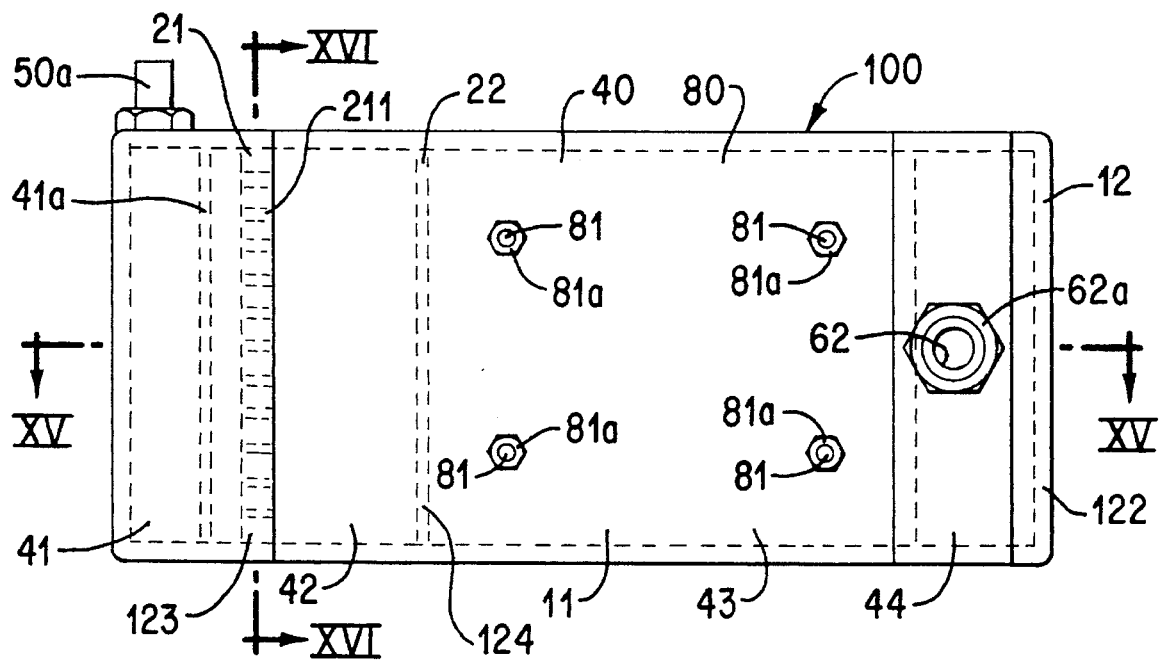
FIG. 14 is a plan view of an apparatus used for electrolyzing water in accordance with a fourth embodiment of the present invention.
Figure 15:
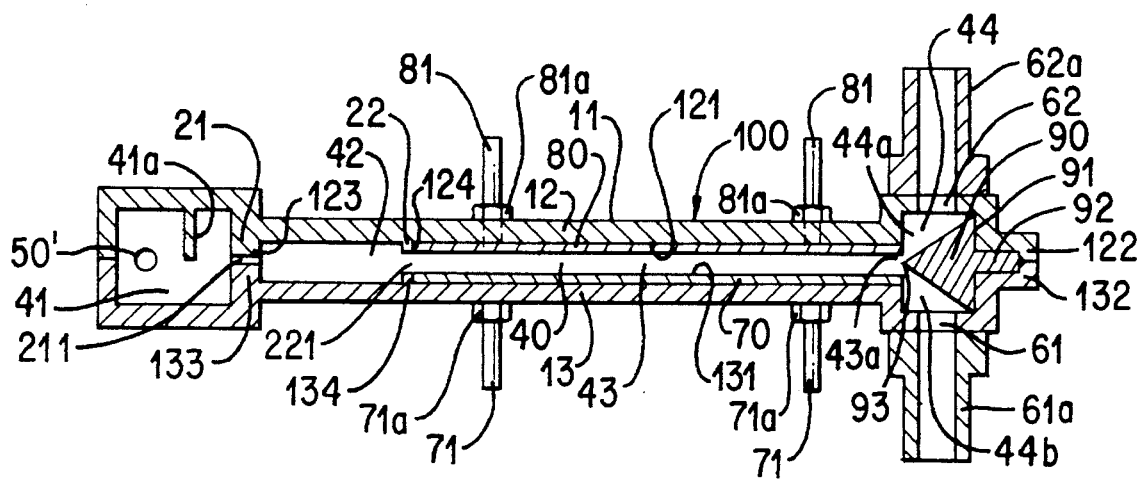
FIG. 15 is a cross-sectional view taken on line XV—XV of FIG. 14.

In the first embodiment, the static pressure of water in the first chamber section 41 has an uneven distribution as indicated by arrows "A" in FIG. 11, because the water flows into first chamber section 41 through inlet port 50 which is located at a lateral center of a top wall of first chamber section 41. The diameter of circular holes 211 formed in first wall 21 is designed to decrease in a stepped manner from both lateral ends to the lateral center of first wall 21 as shown in FIG. 10. The degree of decrease in the diameter of circular holes 211 is designed to correspond to the distribution of the static pressure of water in the first chamber section 41. As a result, fluid friction is generated at circular holes 211, and increases in a stepped manner from both lateral ends to the lateral center of first wall 21. Therefore, a distribution of the flow speed of water in the second chamber section 43 becomes generally uniform, as indicated by arrows "B" in FIG. 11. Accordingly, first wall 21 having circular holes 211 functions as a device for generating an uniform distribution of a flow speed of water in the second chamber section 42.

Second chamber section 42 is structured to remove the turbulence generated in the water when the water has just passed through circular holes 211. Therefore, at the flow end portion (to the right in FIG. 8) of second chamber section 42, the water flows in a condition similar to laminar flow. Accordingly, second chamber section 42 functions as a device for generating the water flow in a laminar flow type of condition. Furthermore, because the top end surface of cathode plate 70 is even with the lower end surface of rectangular slot 221 and the bottom end surface of anode plate 80 is even with the upper end surface of rectangular slot 221, the water flowing through second chamber section 42 still flows through third chamber section 43 in a condition similar to a laminar flow. Accordingly, the water flows through third chamber section 43 in the condition similar to the laminar flow with a uniform distribution of the flow speed. As a result, the time for electrolyzing water in the third chamber section 43 becomes equal at any portion with respect to the lateral direction. Therefore, the electrolyzation of water in the third chamber section 43 is efficiently carried out.

Furthermore, by means of fixedly connecting four terminal rods 71 and 81 to four corner regions of the upper surface of cathode and anode plates 70 and 80, respectively, the potential difference between any part of the cathode and anode plates 70 and 80 becomes generally uniform during the electrolyzation of water in the third chamber section 43.

Still furthermore, the $H^+$ rich water layer close to anode plate 80 and the $OH^-$ rich water layer close to cathode plate 70 are effectively guided by triagonal prism member 90, because the dimensions of trigonal prism member 90 are designed, such that the distance "S" measured between the ridge 93 and the outlet 43a of third chamber section 43 is in the following optimum range which has been experimentally determined.

$$-(\tfrac{1}{2}).H_3 \leq S \leq +(\tfrac{1}{2}).H_3 \tag{5}$$

As a result, a defective mixture of the $H^+$ rich water and the $OH^-$ rich water at fourth chamber section 44 can be effectively prevented.

Moreover, inlet port 50 may be located at a lateral center of a bottom wall or a lateral center of a longitudinal end wall (to the left in FIG. 8) of first chamber section 41. In this situation, the degree of decrease in the diameter of circular holes 211 is designed to be similar to that as shown in FIG. 10. Furthermore, when inlet port 50 is located at a position which is offset from the lateral center of any of the top wall, the bottom wall and the longitudinal end wall (to the left in FIG. 8) of first chamber section 41, the distribution of the static pressure generated in the first chamber section 41 differs from that described above. Therefore, the degree of decrease in the diameter of circular holes 211 is designed to correspond to the above different distribution of the static pressure in first chamber section 41.

FIGS. 12, 13, 14–17, 18, 19, 20–21, 22–23, 24–25, 26–27, 28 and 29 illustrate second through twelfth embodiments of the present invention, respectively. Only features and effects derived from the respective second through thirteenth preferred embodiments will be described, and an explanation of the other features and effects that are similar to those of the first embodiment will be omitted.

Figure 12:
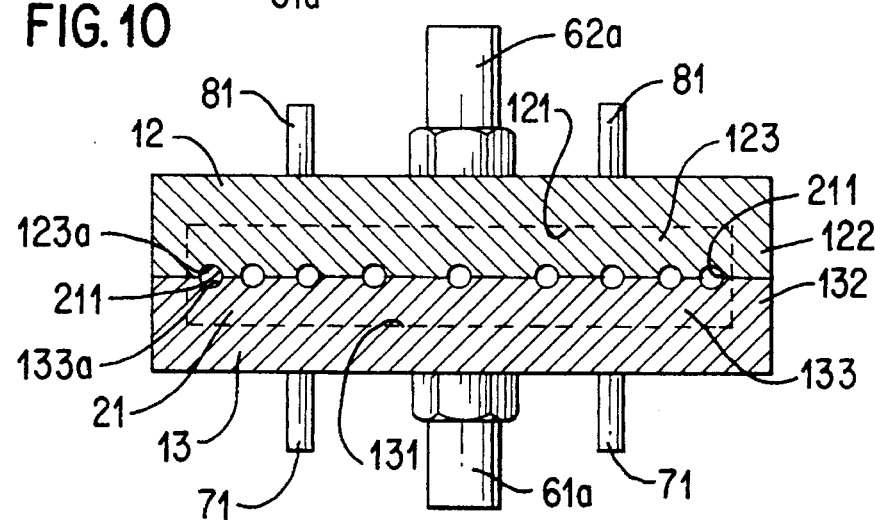
FIG. 12 is a cross-sectional view of a first wall of a casing of an apparatus which is used for electrolyzing water in accordance with a second embodiment of the present invention.

FIG. 12 illustrates a part of an electrolyzing apparatus in accordance with a second embodiment of the present invention. In FIG. 12, the same numerals are used to denote similar elements as those shown in FIG. 10, so a detailed explanation thereof is omitted. In the second embodiment, a plurality of, for example, nine identical first indents 123a, each having a semicircular cross section, are formed at the bottom end surface of first rectangular parallelpiped projection 123. First indents 123a are arranged such that the intervals between adjacent first indents 123a increase in a stepped manner from both lateral ends to the lateral center of first rectangular parallelpiped projection 123. Similarly, a plurality of, for example, nine identical second indents 133a, each having a semicircular cross section, are formed at the top end surface of third rectangular parallelpiped projection 133. The radius of each of second indents 133a is designed to be about equal to that of first indents 123a. Second indents 133a are arranged to face and align with corresponding first indents 123a.

When the upper and lower members 12 and 13 are attached to each other at their flange portions 122 and 132, the bottom end surface of first rectangular parallelpiped projection 123 is in contact with the top end surface of third rectangular parallelpiped projection 133 because the bottom end surface of first rectangular parallelpiped projection 123 is even with the bottom end surface of flange portion 122 of upper member 12, and the top end surface of third rectangular parallelpiped projection 133 is even with the top end surface of flange portion 132 of the lower member 13. Accordingly, nine identical circular holes 211 are defined by first and second indents 123a and 133a at the mating surfaces of first and third rectangular parallelpiped projections 123 and 133, so that first chamber section 41 is linked to second chamber section 42 through holes 211. Intervals between the adjacent circular holes 211 are varied in a stepped manner to increase from both lateral ends to the lateral center of first wall 21. The degree of increase in the interval between the adjacent circular holes 211 is designed to correspond to the distribution of the static pressure of water in the first chamber section 41. As a result, fluid friction is generated at circular holes 211 to increase in a stepped manner from both lateral ends to the lateral center of first wall 21. Accordingly, a distribution of the flow speed of water in the second chamber section 42 becomes a generally uniform, as in the first embodiment.

Furthermore, though the numbers of circular holes 211 are eleven and nine in the first and second embodiments, respectively, this can be varied to any other number in response to the distribution of the static pressure of water in the first chamber section 41. Moreover, in the first and second embodiments, holes 211 formed at first wall 21 are shaped in a circular configuration, however, they can be shaped in any other configuration, for example, as rectangles, ovals or triangles.

Figure 13:
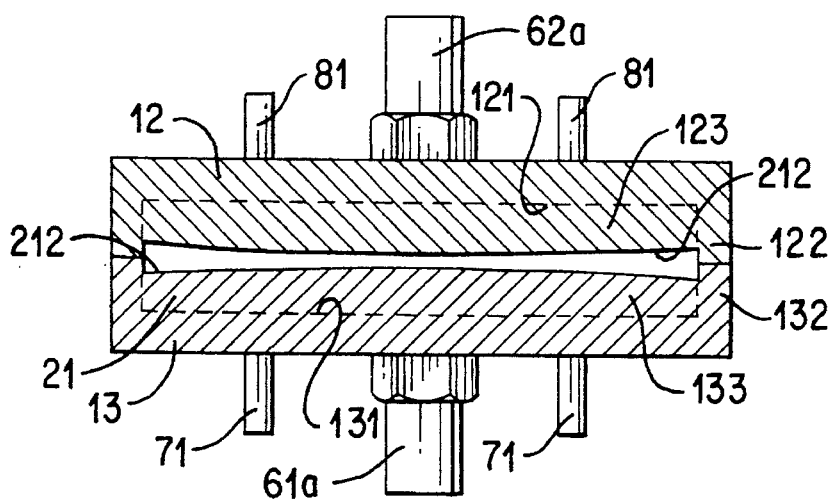
FIG. 13 is a cross-sectional view of a first wall of a casing of an apparatus which is used for electrolyzing water in accordance with a third embodiment of the present invention.

FIG. 13 illustrates a part of an electrolyzing apparatus in accordance with a third embodiment of the present invention. In FIG. 13, the same numerals are used to denote similar elements as those shown in FIG. 10, so a detailed explanation thereof is omitted. In the third embodiment, first rectangular parallelpiped projection 123 is designed such that the bottom end surface thereof is higher than the bottom end surface of flange portion 122 of upper member 12. First rectangular parallelpiped projection 123 gradually increases its height from both lateral ends to the lateral center thereof. Similarly, third rectangular parallelpiped projection 133 is designed such that the top end surface thereof is lower than the top end surface of flange portion 132 of lower member 13. Third rectangular parallelpiped projection 133 gradually increases its height from both lateral ends to the lateral center thereof.

Accordingly, when the upper and lower members 12 and 13 are attached to each other at their flange portions 122 and 132, slot 212 is formed in first wall 21 at the mating surfaces of first and third rectangular parallelpiped projections 123 and 133, so that first chamber section 41 is linked to second chamber section 42 through slot 212. The width of slot 212 gradually decreases from both lateral ends to the lateral center of first wall 21. The degree of decrease in the width of slot 212 is designed to correspond to the distribution of the static pressure of water in the first chamber section 41. As a result, fluid friction is generated at slot 212 and gradually increases from both lateral ends to the lateral center of first wall 21. Accordingly, a distribution of the flow speed of water in the second chamber section 42 becomes generally uniform, as in the first embodiment.

FIGS. 14–17 illustrate an electrolyzing apparatus in accordance with a fourth embodiment of the present invention. In FIGS. 14–17, the same numerals are used to denote similar elements as those shown in FIGS. 7–10, so that a detailed explanation thereof is omitted. In the fourth embodiment, the electrolyzing apparatus 100 is provided with inlet port 50' which is located at a latitudinal center of one lateral end wall (to the top in FIG. 14) of first chamber section 41 at a region forward (to the left in FIG. 14) of guide wall 41a. Joint element 50a is associated with inlet port 50' so as to be connected to, for example, a faucet (not shown) of city water supply through a pipe member (not shown). The static pressure of water in the first chamber section 41 has an uneven distribution as indicated by arrows "A" in FIG. 17, because the water flows into first chamber section 41 through inlet port 50 which is located at one lateral end wall (to the top in FIG. 14) of first chamber section 41.

Figure 16:
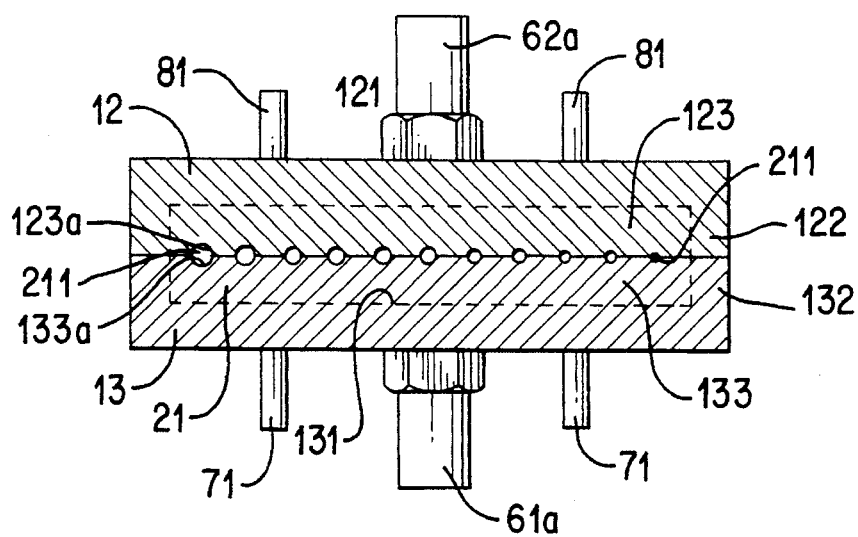
FIG. 16 is a cross-sectional view taken on line XVI—XVI of FIG. 14.

As illustrated in FIG. 16, a plurality of, for example, eleven first indents 123a, each having a semicircular cross section, are formed at a bottom end surface of first rectangular parallelpiped projection 123. First indents 123a are arranged to be spaced one another at about equal intervals, and their radii decrease in a stepped manner from one lateral end (to the left in FIG. 16) to the other lateral end (to the right in FIG. 16) of first rectangular parallelpiped projection 123. Similarly, a plurality of, for example, eleven second indents 133a, each having semicircular cross section, are formed at a top end surface of third rectangular parallelpiped projection 133. Second indents 133a are arranged to face and align with corresponding first indents 123a. The corresponding first and second indents 123a and 133a are identical. Accordingly, the radii of second indents 133a decrease in a stepped manner from one lateral end (to the left in FIG. 16) to the other lateral end (to the right in FIG. 16) of third rectangular parallelpiped projection 133, in the same manner as the radius of first indents 123a decrease.

When the upper and lower members 12 and 13 are attached to each other at their flange portions 122 and 132, the bottom end surface of first rectangular parallelpiped projection 123 is in contact with the top end surface of third rectangular parallelpiped projection 133 because the bottom end surface of first rectangular parallelpiped projection 123 is even with the bottom end surface of flange portion 122 of upper member 12, and the top end surface of third rectangular parallelpiped projection 133 is even with the top end surface of flange portion 132 of the lower member 13. Accordingly, eleven circular holes 211 having various diameters are defined by first and second indents 123a and 133a at the mating surfaces of first and third rectangular parallelpiped projections 123 and 133. First chamber section 41 thus is linked to second chamber section 42 through holes 211. The diameter of circular holes 211 decreases in a stepped manner from one lateral end (to the left in FIG. 16) to the other lateral end (to the right in FIG. 16) of first wall 21. The degree of decrease in the diameter of circular holes 211 is designed to correspond to the distribution of the static pressure of water in the first chamber section 41.

As a result, fluid friction is generated at circular holes 211 and increases in a stepped manner from one lateral end (to the left in FIG. 16) to the other lateral end (to the right in FIG. 16) of first wall 21. Accordingly, the distribution of the flow speed of water in the second chamber section 42 becomes generally uniform, as indicated by arrows "B" in FIG. 17 in a similar fashion to the first embodiment.

Figure 18:
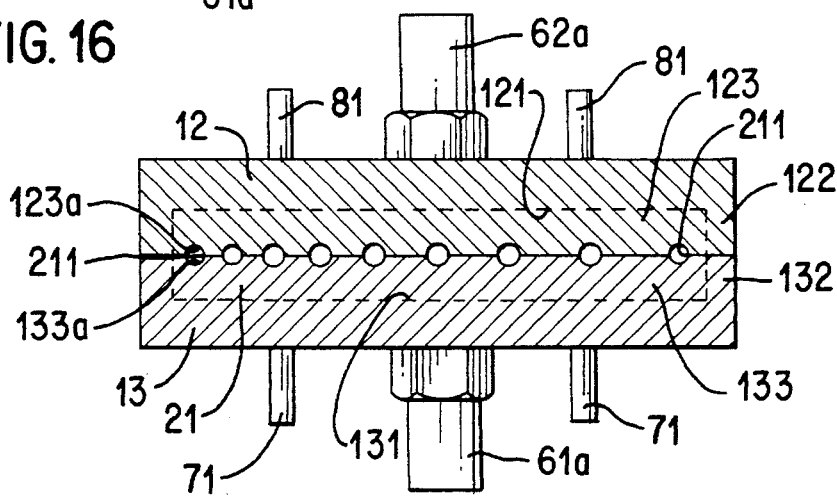
FIG. 18 is a cross-sectional view of a first wall of a casing of an apparatus which is used for electrolyzing water in accordance with a fifth embodiment of the present invention.

FIG. 18 illustrates a part of an electrolyzing apparatus in accordance with the fifth embodiment of the present invention. According to the fifth embodiment, a plurality of, for example, nine identical first indents 123a each having a semicircular cross section, are formed at a bottom end surface of first rectangular parallelpiped projection 123. First indents 123a are arranged such that the intervals between adjacent first indents 123a increase in a stepped manner from one lateral end (to the left in FIG. 18) to the other lateral end (to the right in FIG. 18) of first rectangular parallelpiped projection 123. Similarly, a plurality of, for example, nine identical second indents 133a, each having a semicircular cross section, are formed at a top end surface of third rectangular parallelpiped projection 133. The radius of each of second indents 133a is designed to be about equal to that of first indents 123a. Second indents 133a are arranged to face and align with corresponding first indents 123a.

When the upper and lower members 12 and 13 are attached to each other at their flange portions 122 and 132, the bottom end surface of first rectangular parallelpiped projection 123 is in contact with the top end surface of third rectangular parallelpiped projection 133 because the bottom end surface of first rectangular parallelpiped projection 123 is even with the bottom end surface of flange portion 122 of upper member 12, and the top end surface of third rectangular parallelpiped projection 133 is even with the top end surface of flange portion 132 of the lower member 13. Accordingly, nine identical circular holes 211 are defined by first and second indents 123a and 133a at the mating surfaces of first and third rectangular parallelpiped projections 123 and 133. First chamber section 41 thus is linked to second chamber section 42 through holes 211. The intervals between the adjacent circular holes 211 increase in a stepped manner from one lateral end (to the left in FIG. 18) to the other lateral end (to the right in FIG. 18) of first wall 21. The degree of increase in the interval between the adjacent circular holes 211 is designed to correspond to the distribution of the static pressure of water in the first chamber section 41.

As a result, fluid friction is generated at circular holes 211 and increases in a stepped manner from one lateral end (to the left in FIG. 18) to the other lateral end (to the right in FIG. 18) of first wall 21. Accordingly, the distribution of the flow speed of water in the second chamber section 42 becomes a generally uniform, similar to the fourth embodiment.

Figure 19:
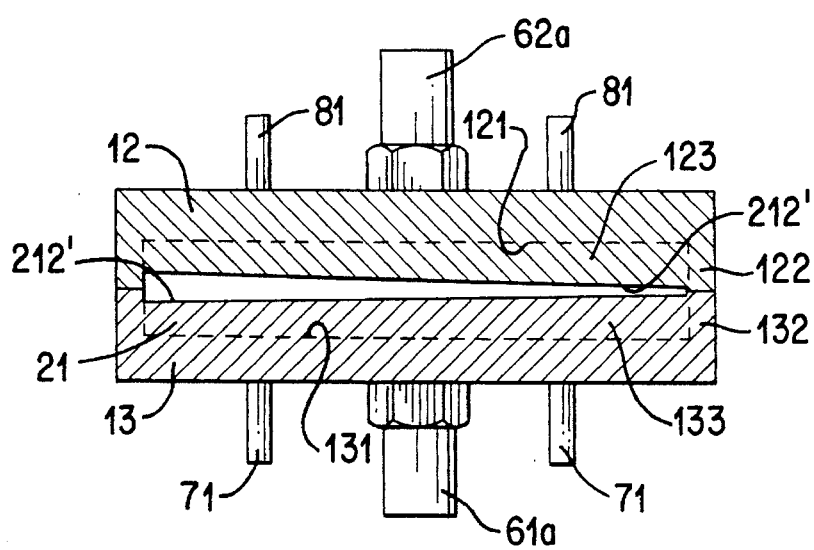
FIG. 19 is a cross-sectional view of a first wall of a casing of an apparatus which is used for electrolyzing water in accordance with a sixth embodiment of the present invention.
Figure 17:
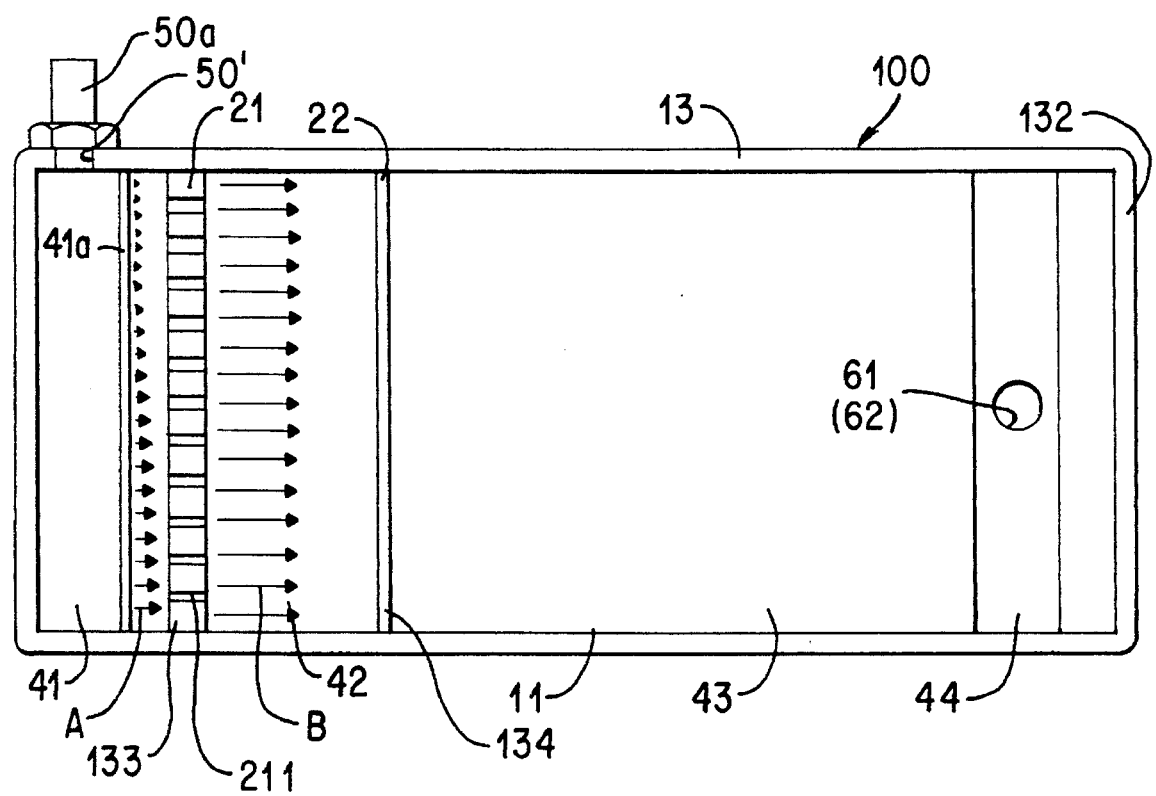
FIG. 17 is a plan view of a lower member of a casing of the apparatus illustrated in FIG. 14. In the drawing, a distribution of static pressure of water in a first chamber section of a water flow chamber of the apparatus, and a distribution of a flow speed of water in a second chamber section of the water flow chamber of the apparatus are schematically illustrated.

FIG. 19 illustrates a part of an electrolyzing apparatus in accordance with the sixth embodiment of the present invention. According to the sixth embodiment, first rectangular parallelpiped projection 123 is designed such that the bottom end surface thereof is higher than the bottom end surface of flange portion 122 of upper member 12. First rectangular parallelpiped projection 123 gradually increases its height from one lateral end (to the left in FIG. 19) to the other lateral end (to the right in FIG. 19) thereof. Similarly, third rectangular parallelpiped projection 133 is designed such that the top end surface thereof is lower than the top end surface of flange portion 132 of lower member 13. Third rectangular parallelpiped projection 133 gradually increases its height from one lateral end (to the left in FIG. 19) to the other lateral end (to the right in FIG. 19) thereof.

Accordingly, when the upper and lower members 12 and 13 are attached to each other at their flange portions 122 and 132, slot 212' is formed in first wall 21 at the mating surfaces of first and third rectangular parallelpiped projections 122 and 132. First chamber section 41 thus is linked to second chamber section 42 through slot 212'. The width of slot 212' gradually decreases from one lateral end (to the left in FIG. 19) to the other lateral end (to the right in FIG. 19) of first wall 21. The degree of decrease in the width of slot 212' is designed to correspond to the distribution of the static pressure of water in the first chamber section 41. As a result, fluid friction is generated at slot 212' and gradually increases from one lateral end (to the left in FIG. 19) to the other lateral end (to the right in FIG. 19) of first wall 21. Accordingly, distribution of the flow speed of water in the second chamber section 42 becomes generally uniform, as in the fourth embodiment.

Figure 20:
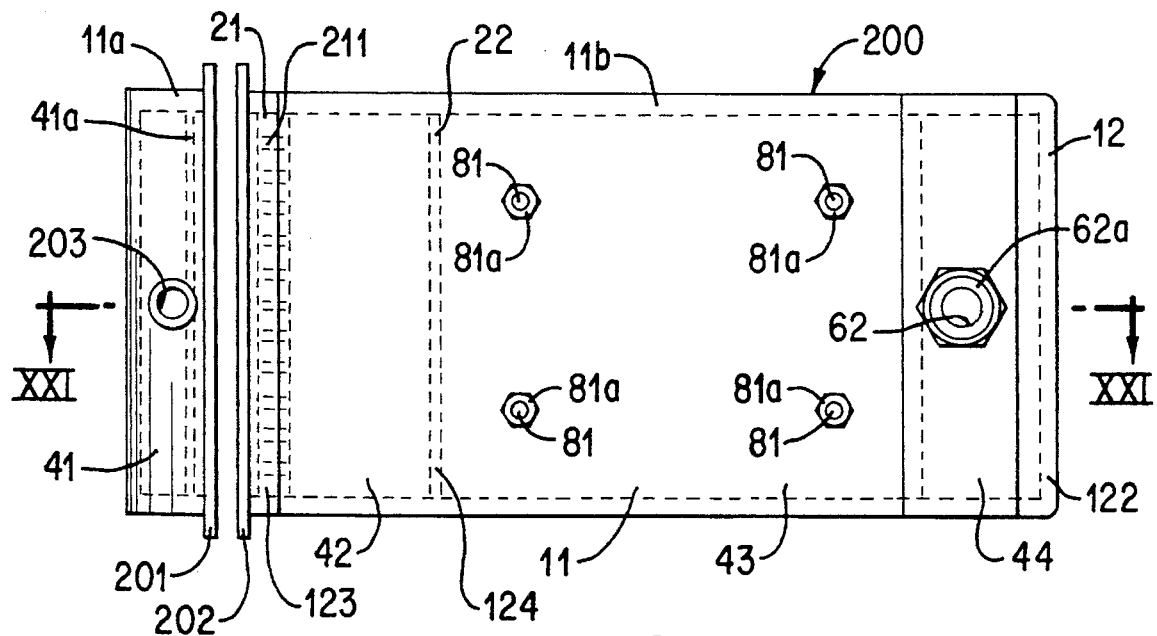
FIG. 20 is an exploded plan view of an apparatus used for electrolyzing water in accordance with a seventh embodiment of the present invention.
Figure 21:
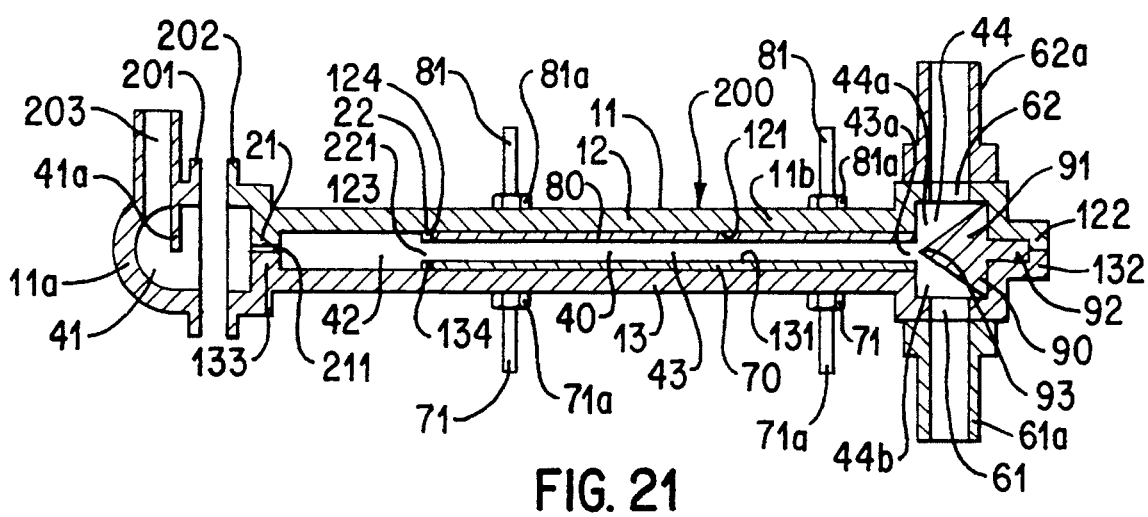
FIG. 21 is a cross-sectional view taken on line XXI—XXI of FIG. 20.

FIGS. 20–21 illustrate an electrolyzing apparatus in accordance with a seventh embodiment of the present invention. In FIGS. 20–21, the same numerals are used to denote similar elements as those shown in FIGS. 7 and 8, so a detailed explanation thereof is omitted. In the seventh embodiment, the electrolyzing apparatus 200 includes casing 11 which is separated into first and second portions 11a and 11b. First and second portions 11a and 11b of casing 11 are separated at first chamber section 41 in the longitudinal direction. Therefore, second portion 11b of casing 11 includes second, third and fourth chamber sections 42–44 of the water flow chamber 40. First portion 11a of casing 11 is semicylindrical in shape, and the longitudinal axis thereof extends along a direction of the width of apparatus 200. First and second portions 11a and 11b of casing 11 include flanges 201 and 202, respectively, which are formed at an outer periphery of their opposing surfaces. Inlet port 203 is formed at a longitudinal center of an upper surface of first portion 11a of casing 11 at a region forward (to the left in FIG. 21) of guide wall 41a. Therefore, first wall 21 as illustrated in FIGS. 10, 12 and 13 is used in this embodiment.

First and second portions 11a and 11b of casing 11 are releasably attached each other at their flange portions 201 and 202 by, for example, bolt-nuts (not shown) through a sealing element (not shown) made of, for example, silicon rubber. Alternatively, first and second portions 11a and 11b of casing 11 may be attached each other at their flanges 201 and 202 by, for example, hot melting. According to this embodiment, first and second portions 11a and 11b of casing 11 are separately prepared so that the electrolyzing apparatus 200 can be easily manufactured.

Furthermore, since an inner wall of first portion 11a of casing 11 has a semicircular cross-section, the water flowing into first chamber section 41 through inlet port 203 can smoothly flow through first chamber section 41 so that the generation of turbulence in the first chamber section 41 can be effectively prevented.

Figure 22:
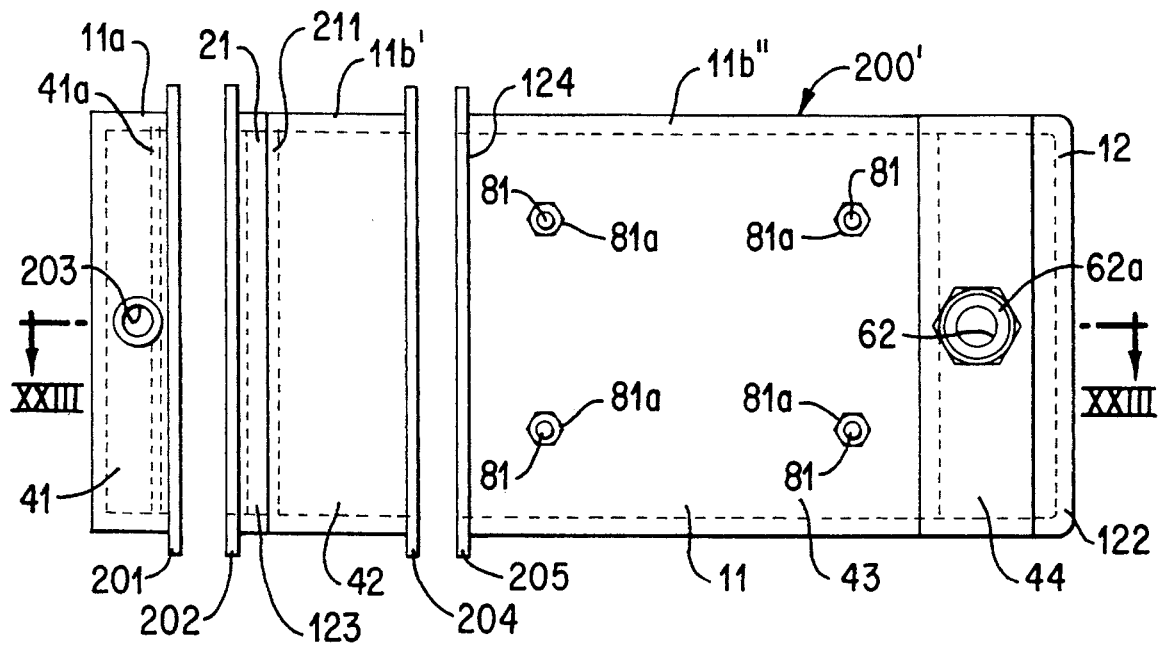
FIG. 22 is an exploded plan view of an apparatus used for electrolyzing water in accordance with an eighth embodiment of the present invention.
Figure 23:
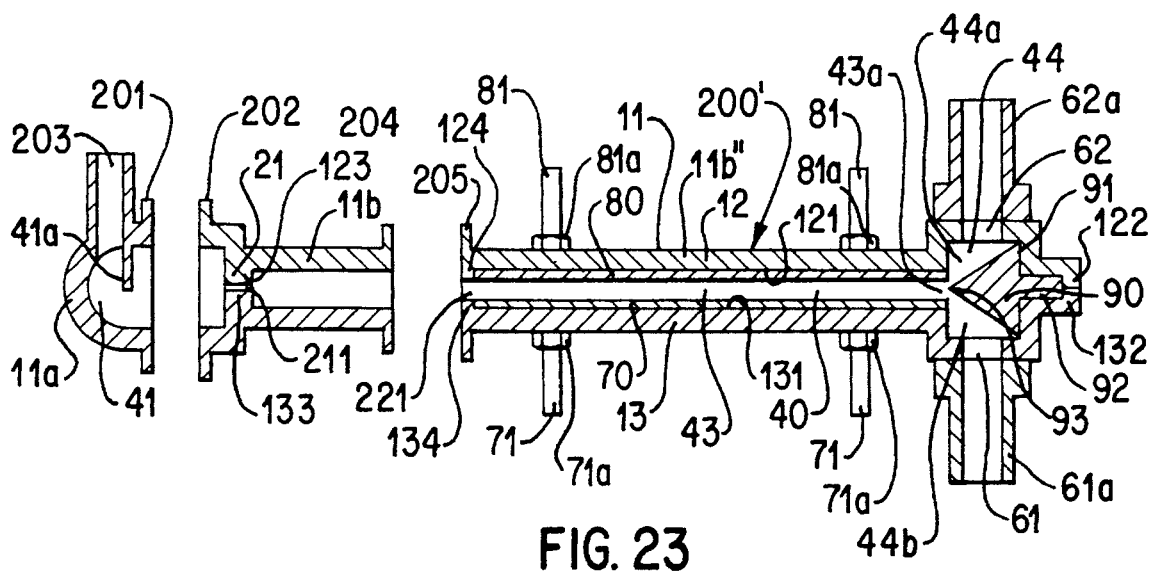
FIG. 23 is a cross-sectional view taken on line XXIII—XXIII of FIG. 22.
Figure 24:
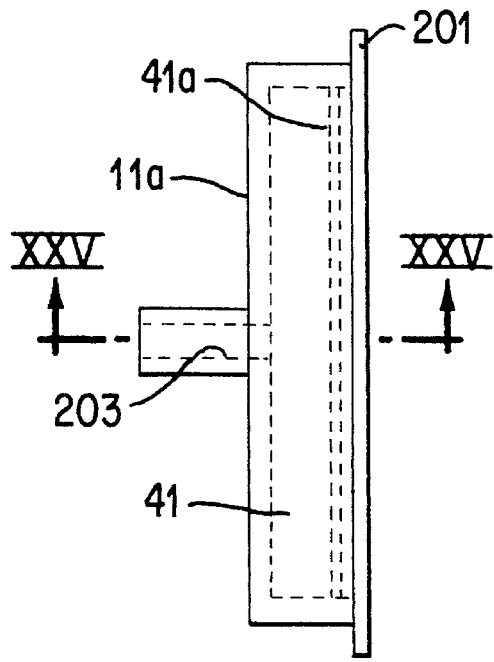
FIG. 24 is a plan view of a part of an apparatus for electrolyzing water in accordance with a ninth embodiment of the present invention.
Figure 25:
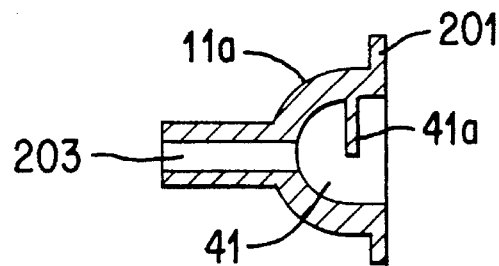
FIG. 25 is a cross-sectional view taken on line XXV—XXV of FIG. 24.
Figure 26:
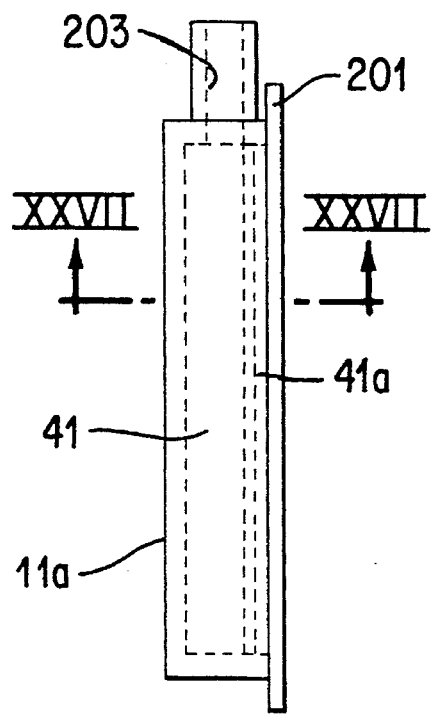
FIG. 26 is a plan view of a part of an apparatus for electrolyzing water in accordance with a tenth embodiment of the present invention.
Figure 27:
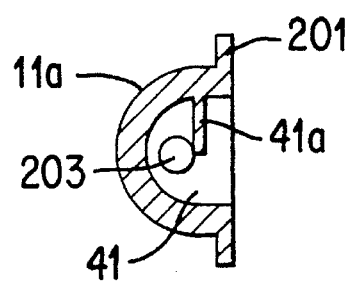
FIG. 27 is a cross-sectional view taken on line XXVII—XXCII of FIG. 26.

FIGS. 22–23 illustrate an electrolyzing apparatus in accordance with an eighth embodiment of the present invention. In FIGS. 22–23, the same numerals are used to denote similar elements as those shown in FIGS. 21 and 22, so that a detailed explanation thereof is omitted. Only features and effects derived from the eighth preferred embodiment will be described so that an explanation of the other features and effects similar to those of the seventh embodiment will be omitted.

In the eighth embodiment, the electrolyzing apparatus 200' includes casing 11 which is separated into first, second and third portions 11a and 11b' and 11b". First and second portions 11a and 11b' of casing 11 are separated at first chamber section 41 in the longitudinal direction in a manner similar to that of the above mentioned seventh embodiment. Second and third portions 11b' and 11b" of casing 11 are separated at second chamber section 42 in the longitudinal direction. Therefore, third portion 11b" of casing 11 includes third and fourth chamber sections 43 and 44 of the water flow chamber 40. First portion 11a of casing 11 has a configuration similar to that of the above-mentioned seventh embodiment. Second and third portions 11b' and 11b" include flanges 204 and 205, respectively, which are formed at an outer periphery of their opposing surfaces. First and second portions 11a and 11b', and second and third portions 11b' and 11b" are releasably attached to each other at their flanges 201 and 202, and 204 and 205 by, for example, bolt-nuts (not shown) through a sealing element (not shown) made of, for example, silicon rubber.

Accordingly to this embodiment, first, second and third portions 11a, 11b' and 11b" of casing 11 are separately prepared so that the electrolyzing apparatus 200' can be easily manufactured. Furthermore, since first, second and third portions 11a, 11b' and 11b" of casing 11 can be selectively repaired and changed, the cost of maintenance of the apparatus 200' can be effectively reduced.

FIGS. 24–25 and 26–27 illustrate a part of an electrolyzing apparatus in accordance with ninth and tenth embodiments of the present invention, respectively. In FIGS. 24–27, the same numerals are used to denote similar elements as those shown in FIGS. 20 and 21, so that a detailed explanation thereof is omitted. Only features and effects derived from the ninth and tenth preferred embodiments will be described so that an explanation of the other features and effects similar to those of the seventh embodiment will be omitted.

In the ninth embodiment, inlet port 203 is formed at a longitudinal center of a middle surface of first portion 11a of casing 11. Because of the location of inlet port 203, first wall 21 as illustrated in FIGS. 10, 12 and 13 is used in this embodiment.

In the tenth embodiment, inlet port 203 is formed at one longitudinal end surface of first portion 11a of casing 11 at a region forward (to the left in FIG. 27) of guide wall 41a. Because of the location of inlet port 203, first wall 21 as illustrated in FIGS. 16, 18 and 19 is used in this embodiment.

First portion 11a of the ninth and tenth embodiments can be used in place of those of the seventh and eighth embodiments. This substitution make advantageous use of space for the installation of the electrolyzing apparatus.

Figure 28:
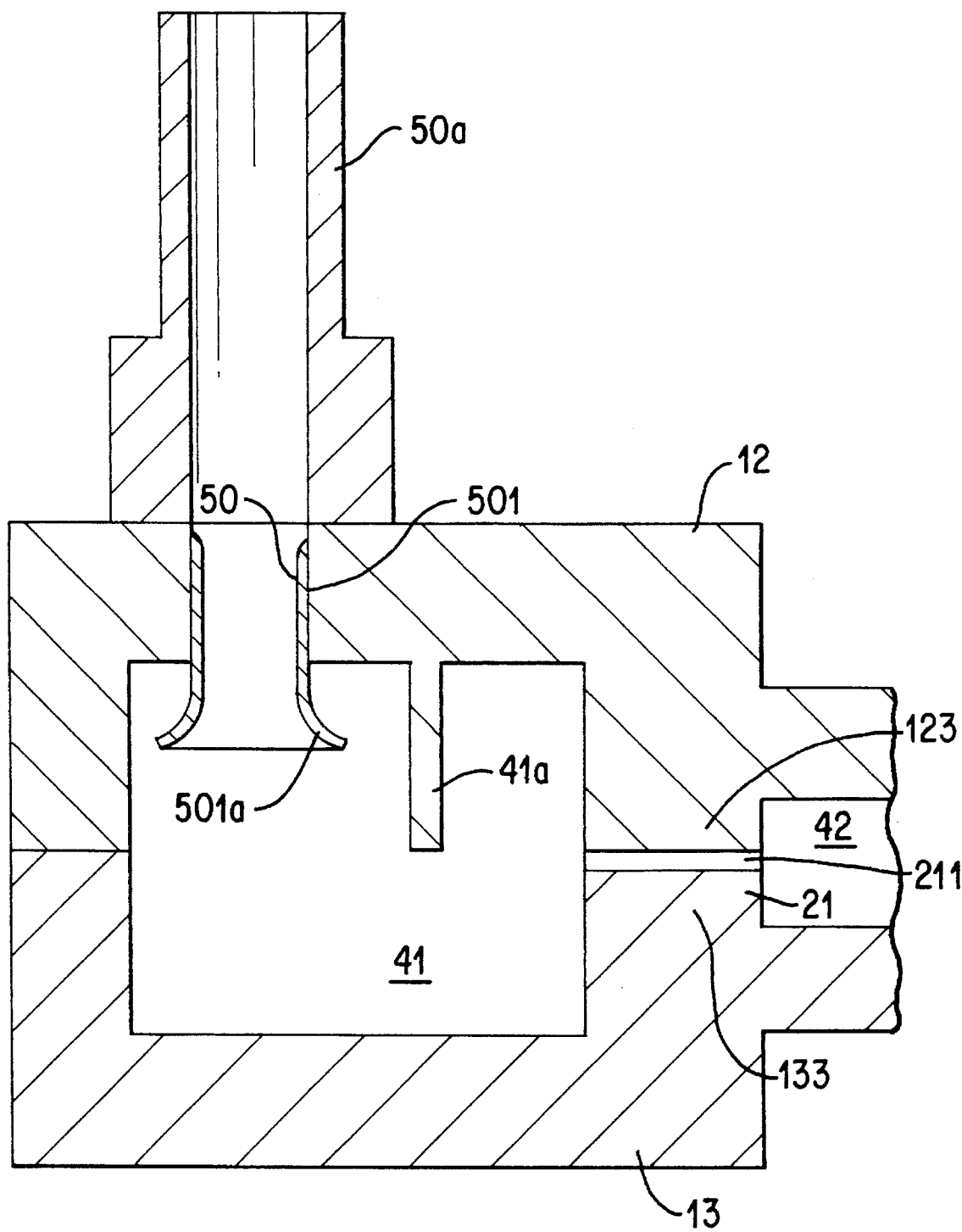
FIG. 28 is an enlarged partial cross-sectional view of an apparatus used for electrolyzing water in accordance with an eleventh embodiment of the present invention.
Figure 29:
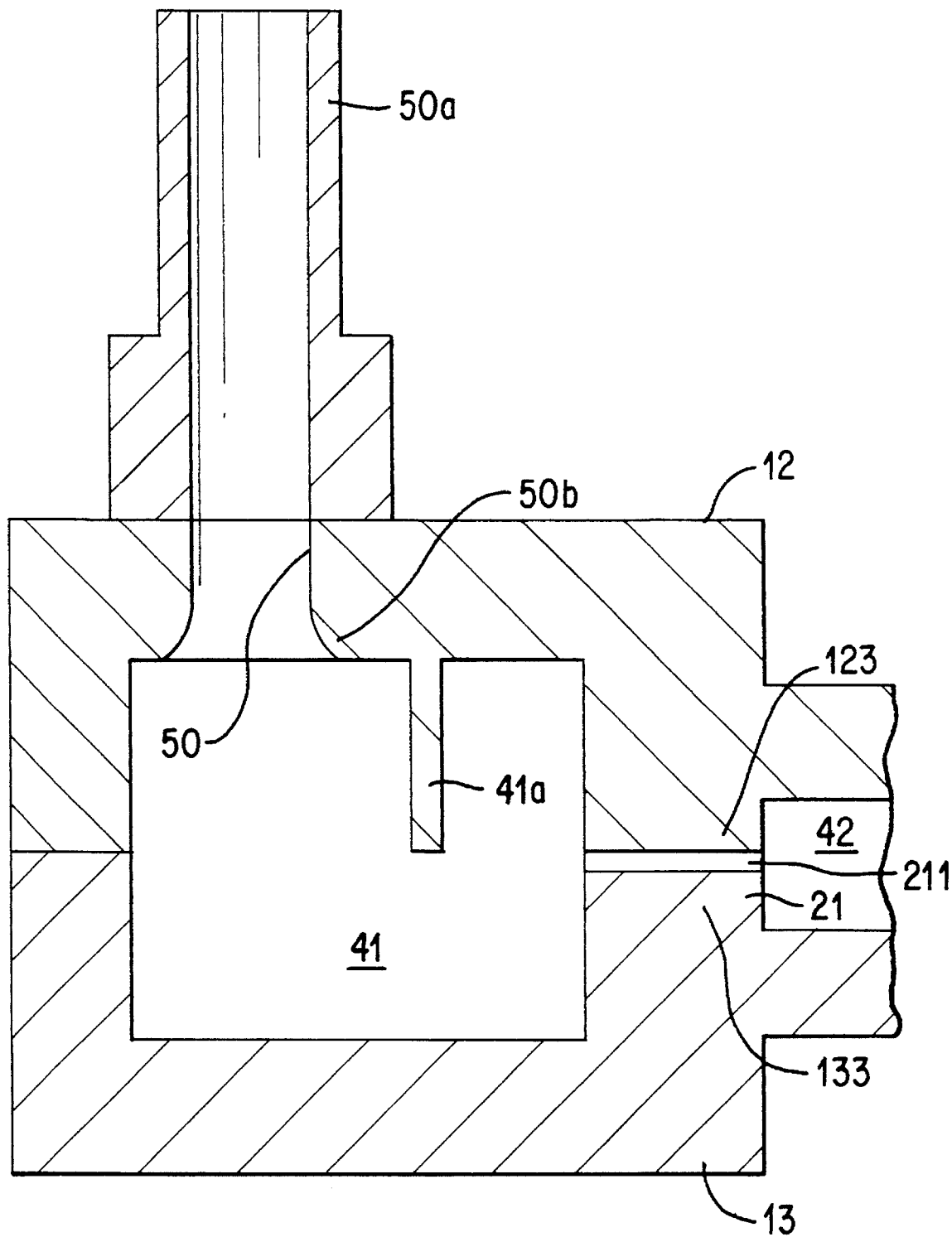
FIG. 29 is an enlarged partial cross-sectional view of an apparatus used for electrolyzing water in accordance with a twelfth embodiment of the present invention.

FIGS. 28 and 29 illustrate a part of an electrolyzing apparatus in accordance with eleventh and twelfth embodiments of the present invention, respectively. In FIGS. 28 and 29, the same numerals are used to denote similar elements as those shown in FIG. 8, so that a detailed explanation thereof is omitted. Only features and effects derived from the eleventh and twelfth preferred embodiments will be described so that an explanation of the other features and effects similar to those of the first embodiment will be omitted.

In the eleventh embodiment, annular cylindrical member 501 is fixedly disposed within inlet port 50 by, for example, by forcible insertion and a friction fit. Annular cylindrical member 501 is made of same material of casing 11, such as, ABS resin, and includes a lower end 501a which projects from an inner surface of the top end wall of first chamber section 41. The lower end 501a of annular cylindrical member 501 is shaped in a bell mouth configuration with a curved gradually increasing diameter.

According to the eleventh and embodiment, since the lower end 501a of annular cylindrical member 501 is shaped in the bell mouth configuration, the water flowing into first chamber section 41 through inlet port 50 can smoothly flow through first chamber section 41. As a result, the generation of turbulence in the first chamber section 41 can be effectively prevented.

In the twelfth embodiment, a lower opening end 50b of inlet port 50 is shaped in a bell mouth configuration with a curved gradually increasing diameter so that the water flowing into first chamber section 41 through inlet port 50 can smoothly flow through first chamber section 41. As a result, the generation of turbulence in the first chamber section 41 can be effectively prevented as in the above-mentioned eleventh embodiment.

Although several preferred embodiments of the present invention have been described in detail herein, it will be appreciated by those skilled in the art that various modifications may be made without materially departing from the novel and advantageous teachings of the invention. Accordingly, the embodiments disclosed herein are by way of example. It is to be understood that the scope of the invention is not to be limited thereby, but is to be determined by the claims which follow.

We claim:

1. In an apparatus for electrolyzing water including a casing within which a hollow space is defined for guiding water therethrough, said hollow space including a first end and a second end which is opposite to said first end, said hollow space including a first chamber section at said first end and second chamber section at said second end, said first and second chamber sections being aligned along a first line which connects said first end and second end;

an inlet port at said first chamber section to conduct water into said first chamber section from outside of said apparatus;

separate first and second outlet ports at said second chamber section to conduct the water to outside of said apparatus from said second chamber section;

a wall in said hollow space of said casing located at a boundary between said first and second chamber sections along a second line perpendicular to said first line to separate said first chamber section from said second chamber section;

a communication path through said wall to provide communication from said first chamber section to said second chamber section;

potential difference generating means provided at said second chamber section for generating potential difference at said second chamber section to electrolyze the water which flows through said second chamber section, the improvement comprising:

said communication path including fluid friction generating means for generating fluid friction along said second line when the water passes through said communication path so that a distribution of flow speed of the water in said second chamber section becomes substantially uniform with respect to said second line.

2. The electrolyzing apparatus of claim 1 wherein said fluid friction generating means includes a plurality of holes having various opening areas.

3. The electrolyzing apparatus of claim 2 wherein each of said holes has a circular cross-section.

4. The electrolyzing apparatus of claim 2 wherein said inlet port is located at a center of said first chamber section with respect to a direction of said second line.

5. The electrolyzing apparatus of claim 4 wherein said opening areas of said holes decrease in a stepped manner toward the center of said first chamber section with respect to the direction of said second line.

6. The electrolyzing apparatus of claim 2 wherein said inlet port is located at a third end farthest from a center of said first chamber section with respect to a direction of said second line.

7. The electrolyzing apparatus of claim 6 wherein said opening areas of said holes decrease in a stepped manner from said third end to a fourth end which is opposite to said third end and farthest from the center of said first chamber section with respect to a direction of said second line.

8. The electrolyzing apparatus of claim 1 wherein said fluid friction generating means includes a plurality of holes which are spaced from one another at various intervals.

9. The electrolyzing apparatus of claim 8 wherein each of said holes has a circular cross-section.

10. The electrolyzing apparatus of claim 8 wherein said inlet port is located at a center of said first chamber section with respect to the direction of said second line.

11. The electrolyzing apparatus of claim 10 wherein the intervals between said holes decrease in a stepped manner toward the center of said first chamber section with respect to a direction of said second line.

12. The electrolyzing apparatus of claim 8 wherein said inlet port is located at a third end farthest from a center of said first chamber section with respect to the direction of said second line.

13. The electrolyzing apparatus of claim 12 wherein said intervals between said holes decrease in a stepped manner from said third end to a fourth end which is opposite to said third end and farthest from the center of said first chamber section with respect to a direction of said second line.

14. The electrolyzing apparatus of claim 1 wherein said fluid friction generating means includes a slot having an opening with an uneven width.

15. The electrolyzing apparatus of claim 14 wherein said inlet port is located at a center of said first chamber section with respect to the direction of said second line.

16. The electrolyzing apparatus of claim 15 wherein the width of the opening of said slot gradually decreases toward the center of said first chamber section with respect to the direction of said second line.

17. The electrolyzing apparatus of claim 14 wherein said inlet port is located at a third end farthest from a center of said first chamber section with respect to a direction of said second line.

18. The electrolyzing apparatus of claim 17 wherein the width of the opening of said slot gradually decreases from said third end to a fourth end which is opposite to said third end and farthest from the center of said first chamber section with respect to a direction of said second line.

19. The electrolyzing apparatus of claim 1 wherein said hollow space is generally rectangular parallelpiped.

20. The electrolyzing apparatus of claim 19, said hollow space further including a third chamber section which is located between said first and second chamber sections, said third chamber section being so sized that a height thereof is greater than a height of said second chamber section and that a length of said third chamber section is equal to or greater than the height of said second chamber section.

21. The electrolyzing apparatus of claim 1 wherein said casing includes first and second portions which are releasably attached each other.

22. The electrolyzing apparatus of claim 21 wherein said first and second portions are separated at said first chamber section.

23. The electrolyzing apparatus of claim 1 wherein said casing includes first, second and third portions which are releasably attached one another.

24. The electrolyzing apparatus of claim 23 wherein said first and second portions are separated at said first chamber section, and said second and third portions are separated at said second chamber section.

25. The electrolyzing apparatus of claim 1 wherein said first chamber section includes a guide wall which is formed at an inner surface of said first chamber section to fluently guide the water into said first chamber section from said inlet port.

26. The electrolyzing apparatus of claim 1, said inlet port including a first opening end which faces said first chamber section, said first opening having a bell mouth configuration.

27. The electrolyzing apparatus of claim 1, said apparatus further including an annular cylindrical member which is fixedly disposed within said inlet port, said annular cylindrical member including a first opening end which faces said first chamber section, said first opening end having a bell mouth configuration.

28. The electrolyzing apparatus of claim 27 wherein said first opening end of said annular cylindrical member projects into said first chamber section.

29. The electrolyzing apparatus of claim 1, said second chamber section further including a first region and a second region which extends from said first region toward said second end, said first and second outlet ports located at said second region of said second chamber section, separating means disposed within said second region of said second chamber section to separate a flow of the water which flows from said first region of said second chamber section into two separate portions.

30. The electrolyzing apparatus of claim 29 wherein said separating means is a triagonal prism member of which one ridge faces one end of said first region of said second chamber section.

* * * * *